(12) United States Patent
Hotta et al.

(10) Patent No.: US 6,345,119 B1
(45) Date of Patent: *Feb. 5, 2002

(54) HANDWRITTEN CHARACTER RECOGNITION APPARATUS AND METHOD USING A CLUSTERING ALGORITHM

(75) Inventors: Yoshinobu Hotta; Satoshi Naoi; Misako Suwa, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/801,139

(22) Filed: Feb. 18, 1997

(30) Foreign Application Priority Data

Feb. 19, 1996 (JP) ................................ 8-030217
Aug. 14, 1996 (JP) ................................ 8-214581

(51) Int. Cl.$^7$ .............................. G06K 9/62; G06K 9/00
(52) U.S. Cl. ....................... 382/225; 382/186
(58) Field of Search ................. 382/225, 187, 382/186

(56) References Cited

U.S. PATENT DOCUMENTS

| | | | | |
|---|---|---|---|---|
| 4,937,747 A | * | 6/1990 | Koller et al. ................ | 364/422 |
| 5,034,991 A | * | 7/1991 | Hagimae et al. ............. | 382/209 |
| 5,187,751 A | * | 2/1993 | Tanaka ....................... | 382/225 |
| 5,343,537 A | * | 8/1994 | Bellegarda et al. .......... | 382/186 |
| 5,537,491 A | * | 7/1996 | Mahoney et al. ............ | 382/218 |
| 5,602,938 A | * | 2/1997 | Akiyama et al. ............ | 382/155 |
| 5,621,861 A | * | 4/1997 | Hayashi et al. .............. | 395/23 |
| 5,764,799 A | * | 6/1998 | Hong et al. .................. | 382/225 |
| 5,796,924 A | * | 8/1998 | Errico et al. ................. | 395/23 |
| 5,970,171 A | * | 10/1999 | Baraghimian et al. ....... | 382/187 |

OTHER PUBLICATIONS

H. Takahasi and K.M. Mohiuddin, "A Clustering Method and Radius Tuning by End Users", IEEE 95 ISBN 0–8186–71289–/95, pp. 698–701, Sep. 1995.*
Ho et al., Decision combination in multiple classifier systems, IEEE PAMI, Jan. 31, 1994.*
Hartigan, J., "Clustering Algorithms", Wiley &Sons, Inc., 1975.*
T. Kawatani, et al., "Verification of Personal Handwriting Charcteristics for Numerals and its Application to Recognition"; *Pattern Recognition Letters 14*, (1993), pp. 335–343.

* cited by examiner

*Primary Examiner*—Amelia M. Au
*Assistant Examiner*—Martin Miller
(74) *Attorney, Agent, or Firm*—Staas & Halsey LLP

(57) ABSTRACT

For a plurality of handwritten characters extracted from an input image, a character category for each character is first determined by a character recognition process. Second, according to a clustering process, similarity levels of character-forms among extracted characters are determined, and based on the determination result, the character category determination result from the first character recognition process is modified.

25 Claims, 29 Drawing Sheets

WRITE NUMBER COLUMN 0321

PURCHASE AMOUNT COLUMN

| 0 | 1 | 2 | 3 | 4 | 5 | 6 | 7 | 8 | 9 |
| 9 | 0 | 1 | 2 | 3 | 4 | 5 | 6 | 7 | 8 |
| 8 | 9 | 0 | 1 | 2 | 3 | 4 | 5 | 6 | 7 |
| 7 | 8 | 9 | 0 | 1 | 2 | 3 | 4 | 5 | 6 |
| 6 | 7 | 8 | 9 | 0 | 1 | 2 | 3 | 4 | 5 |
| 5 | 6 | 7 | 8 | 9 | 0 | 1 | 2 | 3 | 4 |
| 4 | 5 | 6 | 7 | 8 | 9 | 0 | 1 | 2 | 3 |

| 0 | 0 | 0 | 0 | 0 | 0 | 1 | 2 | 3 | 4 |
| 0 | 0 | 0 | 0 | 0 | 0 | 1 | 2 | 3 | 5 |
| 0 | 0 | 0 | 0 | 0 | 0 | 1 | 2 | 3 | 6 |

FIG. 7

0 1 2 3 4 5    SALES LEDGER

- - - - -     - - - - - -    DATE - - - -

PRODUCT NAME    UNIT PRICE    PURCHASER    QUANTITY

| PRODUCT NAME | UNIT PRICE | PURCHASER | QUANTITY |
|---|---|---|---|
| 001 | 1300 | 1238 | 10 |
| 002 | 1500 | 1206 | 8 |
| 003 | 1200 | 2219 | 15 |
|  | 3300 | 2055 | 12 |
|  | 4000 | 2124 | 15 |
|  | 8500 | 2149 | 20 |
|  | 2300 | 1008 | 25 |
|  | 1200 | 2202 | 27 |
|  | 980 | 1003 | 30 |
|  | 3400 | 1001 | 15 |
|  | 2350 | 5558 | 3 |
|  | 4200 | 3501 | 5 |
|  | 3200 | 9716 | 10 |
|  | 2500 | 9746 | 9 |
|  | 6000 | 2819 | 8 |

TOTAL SALES

PERSON IN CHARGE : TARO NIPPON

ABC CORPORATION

FIG. 8

4 COLUMNS

5 ROWS

VECTOR A = ( 1,1,1,1,
0,0,0,1,
1,1,1,1,
1,0,0,0,
1,1,1,1 )

VECTOR B = ( 0,1,1,1,
0,0,0,1,
1,1,1,1,
1,0,0,0,
1,1,1,1 )

VECTOR C = ( 1,1,1,1,
0,0,0,1,
0,1,1,0,
1,0,0,0,
1,1,1,1 )

| INPUT CHARACTER | FEATURE VECTOR | |
|---|---|---|
| [5x4 grid] | VECTOR = ( 0,1,1,1,<br>0,0,0,1,<br>1,1,1,1,<br>1,0,0,0,<br>1,1,1,1 ) | |

| CHARACTER ENTERED IN DICTIONARY | FEATURE VECTOR | BETWEEN - VECTOR DISTANCE FROM INPUT CHARACTER |
|---|---|---|
| [5x4 grid] | VECTOR_1 = ( 0,1,1,0,<br>0,1,1,0,<br>0,1,1,0,<br>0,1,1,0,<br>0,1,1,0 ) | DISTANCE = \|VECTOR - VECTOR_1\|<br>= \|0-0\| +\|1-1\|+\|1-1\|+\|1-0\|+<br>....<br>= 11 |
| [5x4 grid] | VECTOR_2 = ( 1,1,1,1,<br>0,0,0,1,<br>1,1,1,1,<br>1,0,0,0,<br>1,1,1,1 ) | DISTANCE = \|VECTOR - VECTOR_2\|<br>= 1 → MINIMUM |
| [5x4 grid] | VECTOR_3 = ( 1,1,1,1,<br>0,0,0,1,<br>1,1,1,1,<br>0,0,0,1,<br>1,1,1,1 ) | DISTANCE = \|VECTOR - VECTOR_3\|<br>= 3 |
| [5x4 grid] | VECTOR_4 = ( 1,0,1,0,<br>1,0,1,0,<br>1,1,1,1,<br>0,0,1,0,<br>0,0,1,0 ) | DISTANCE = \|VECTOR - VECTOR_4\|<br>= 11 |

FIG. 10

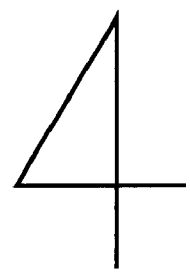
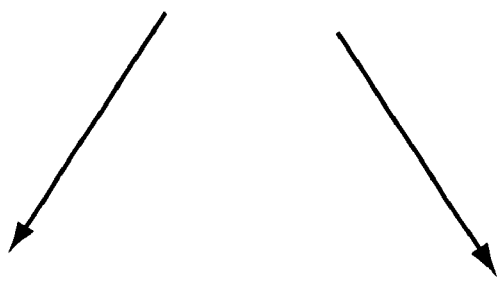
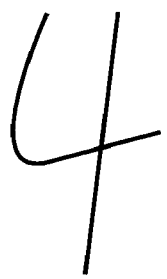 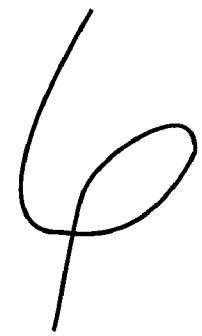
 
MISRECOGNIZED FOR '9'  MISRECOGNIZED FOR '6'
FIG. 29

HANDWRITTEN CHARACTER RECOGNITION APPARATUS AND METHOD USING A CLUSTERING ALGORITHM

BACKGROUND OF THE INVENTION

1. Field of the Invention

The present invention relates to a character recognition apparatus for recognizing character categories of a number of input characters written by the same writer, and more specifically to a character recognition apparatus for recognizing a handwritten character with high precision without collecting character samples.

2. Description of the Related Art

There has been a conventional character recognition apparatus for optically reading a handwritten document using an image scanner, generating image data, and recognizing a handwritten character from the image data. Recently, an increasing number of handwritten character recognition apparatuses, that is, optical character reader (OCR), have been demanded as peripherals for inputting handwritten characters. A considerably high character recognition ratio is required to put the handwritten character recognition apparatus for practical use.

A character recognition apparatus for recognizing a handwritten character requires a configuration with which a character recognition ratio can be enhanced by taking the unique features of characters handwritten by a writer.

A character recognition apparatus recognizes a character category of an input character by matching the feature of an input character against the feature of the character category entered in the dictionary.

However, since the character dictionary is prepared for a general purpose, it is difficult to completely cover unique personal variations of handwritten characters, thereby lowering the character recognition ratio.

Conventionally, the correct recognition ratio has been enhanced by generating the feature of a character category entered in the dictionary based on the character samples preliminarily collected for each writer when handwritten characters are recognized, and by appropriately amending for each writer the feature of an input character when the feature of the input character is extracted based on the collected samples.

However, if a dictionary is prepared and amended appropriately for writers as in the conventional method, there arises the problem that character samples should be collected before performing a recognizing process.

There also arises another problem that a dictionary should be re-prepared by re-collecting the character samples at predetermined time intervals and amendment parameters should be re-generated so that a high character recognition ratio can be maintained because the features of handwritten characters of each writer change with time little by little.

Furthermore, when there are a number of writers whose handwritten characters are recognized, the dictionary should be prepared for each writer or amendment parameters should be appropriately managed, thereby requiring an excessively large memory capacity.

SUMMARY OF THE INVENTION

The present invention aims at providing a character recognition apparatus capable of amending a wrong character-recognition result to a correct character-recognition result.

According to the feature of the present invention, a character category to which each input character having a predetermined state belongs is discriminated.

Based on the similarity between input characters, a cluster containing input characters as elements are generated. If there are clusters different in character category and the distance between the clusters is short, then the character category of the cluster containing a smaller number of elements is amended to the character category of the cluster containing a larger number of elements.

A predetermined state of an input character refers to characters handwritten by the same writer, obscure characters, deformed characters, etc.

Thus, a character recognizing process can be correctly performed on various states without preparing a recognition dictionary for each writer or for each character quality.

BRIEF DESCRIPTION OF THE DRAWINGS

FIG. 7 shows an example 1 of a document according to an embodiment of the present invention;

FIG. 8 shows an example 2 of a document according to an embodiment of the present invention;

FIG. 10 shows an example of discriminating a character category according to an embodiment of the present invention;

FIG. 29 shows an example of an easily-misrecognized handwritten character.

DETAILED DESCRIPTION OF THE PREFERRED EMBODIMENT

Described below is an example of the character recognition apparatus which has received a handwritten character having a personal handwriting feature according to an embodiment of the present invention.

Figure 1:
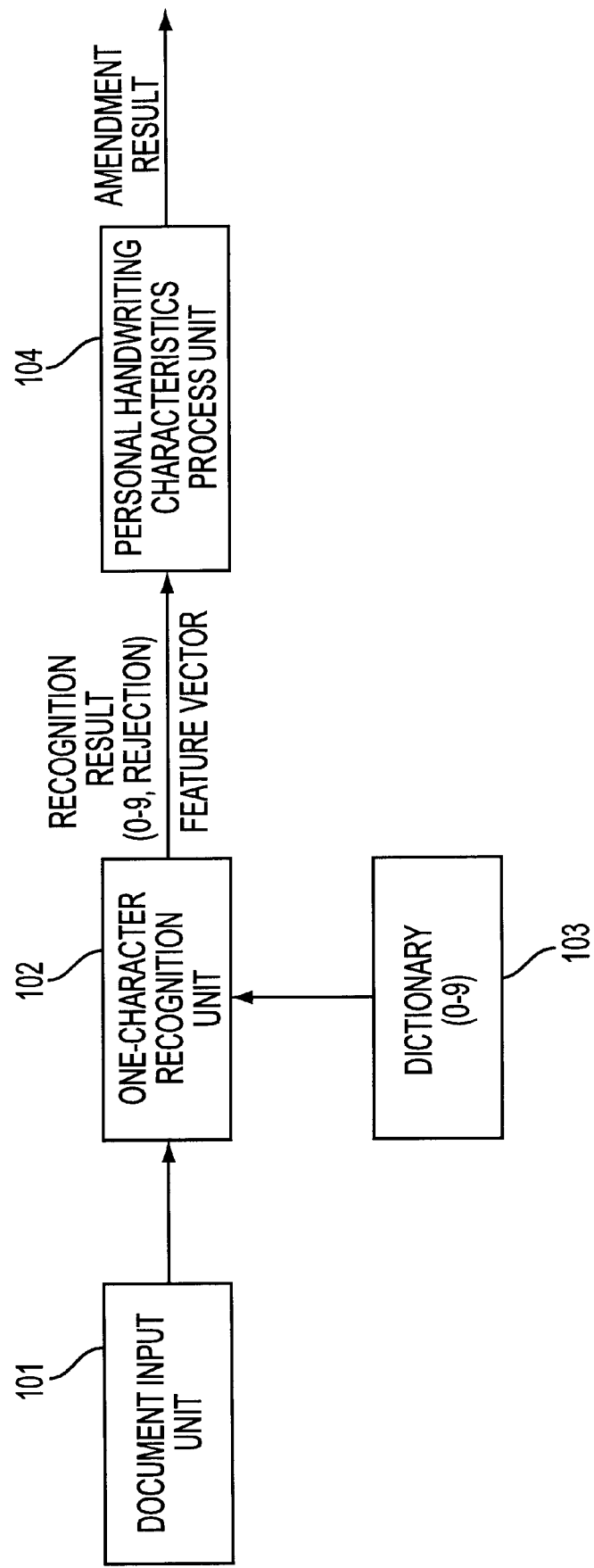
FIG. 1 is a block diagram showing the configuration of the character recognition apparatus according to the first embodiment of the present invention.

FIG. 1 is a block diagram showing the configuration of the character recognition apparatus according to the first embodiment of the present invention.

In FIG. 1, 101 shows a document input unit, 102 shows a one-character recognition unit, 103 shows a recognition dictionary, and 104 shows a personal handwriting characteristics process unit.

The document input unit 101 receives a number of characters entered in a form, etc. by the same writer.

The one-character recognition unit 102 recognizes a character inputted from the document input unit 101 by matching it against the feature vector of the category entered in the dictionary 103.

For example, if handwritten numerals '0' through '9' are inputted to the one-character recognition unit 102 from the document input unit 101, then the one-character recognition unit 102 matches the inputted numerals against the feature vectors in the categories '0' through '9' entered in the dictionary 103.

Then, the one-character recognition unit 102 selects from the dictionary 103 the category closest to the numeral inputted from the document input unit 101, and transmits the recognition result to the personal handwriting characteristics process unit 104.

If the numeral inputted from the document input unit 101 is not close to any feature vectors of the categories '0' through '9' entered in the dictionary 103, then a rejection result is transmitted to the personal handwriting characteristics process unit 104.

Furthermore, the one-character recognition unit 102 also transmits to the personal handwriting characteristics process unit 104 the feature vector of the handwritten character inputted from the document input unit 101 together with the recognition results.

The personal handwriting characteristics process unit 104 generates clusters by clustering the feature vectors of an input character. When there is a cluster belonging to a character category close to a cluster belonging to another character category, the recognized character category of the cluster having a smaller number of input characters between the two clusters is amended to the recognized character category of the cluster having a larger number of input characters.

Thus, no preprocesses such as entering handwriting features of a writer are required before the handwritten character recognizing process is performed, thereby constantly realizing a correct and efficient handwritten-character recognizing process.

Figure 2:
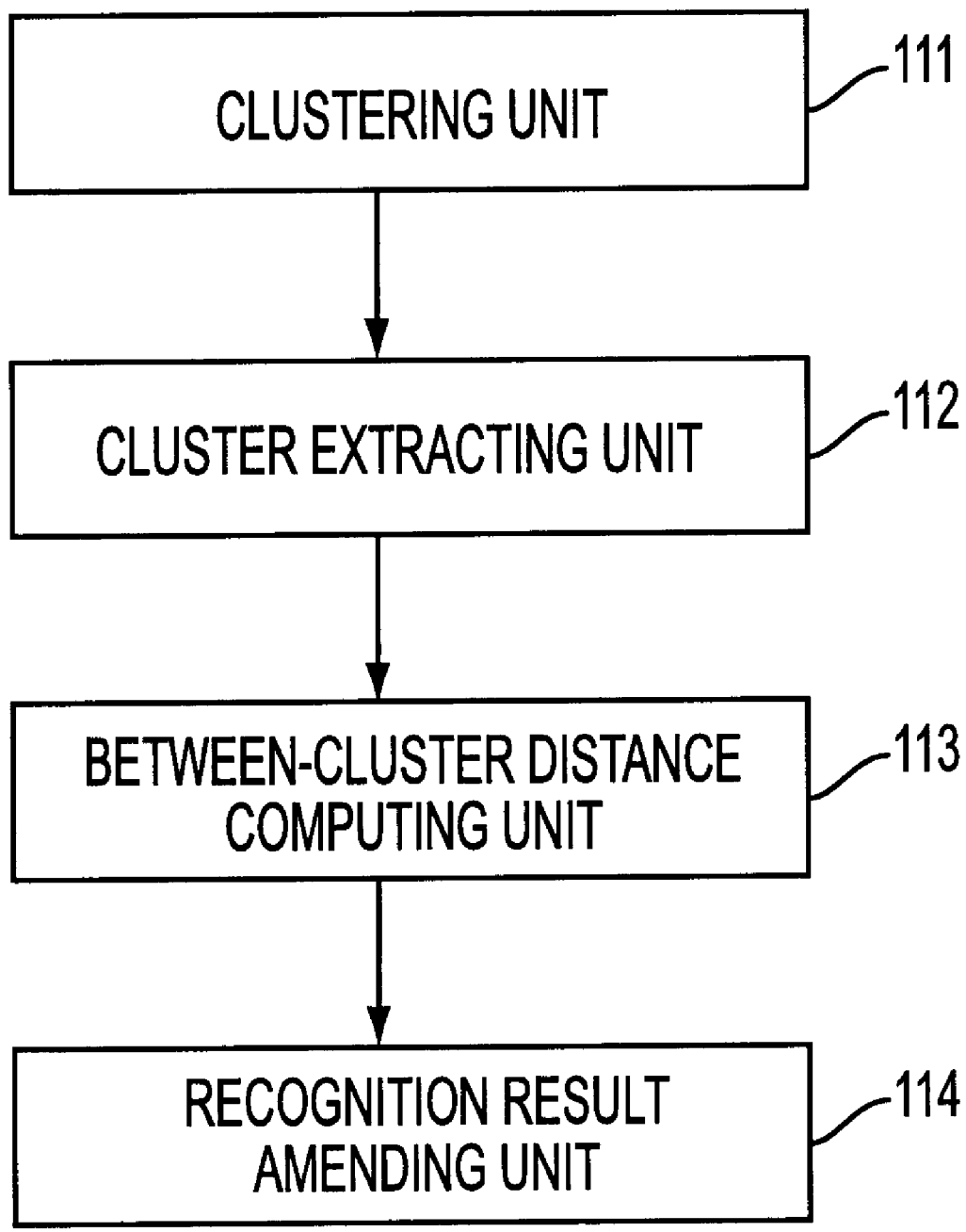
FIG. 2 is a block diagram showing the configuration of the processing unit functioning for each personal handwriting feature shown in FIG. 1.

FIG. 2 is a block diagram showing an example of the configuration of the personal handwriting characteristics process unit 104.

A clustering unit 111 generates in each category a plurality of clusters containing handwritten characters as elements by clustering handwritten characters in each category.

A cluster extracting unit 112 extracts a cluster containing the number of elements smaller than a predetermined value from the cluster generated by the clustering unit 111.

A between-cluster or an inter-cluster distance computing unit 113 computes a between-cluster distance between the first cluster belonging to the first category extracted by the cluster extracting unit 112 and the second cluster belonging to the second category extracted by the clustering unit 111.

A recognition result amending unit 114 integrates the first cluster into the second cluster when the between-cluster distance between the first and second clusters is smaller than a predetermined value, and amends the first category to which the first cluster belongs to the second category to which the second cluster belongs.

Even if it is determined based on the personal handwriting feature that handwritten characters belonging to the same category belong to different categories, the handwritten characters having high similarity levels to each other are clustered into the same cluster, and a handwritten character category containing a smaller number of elements is amended to a handwritten character category containing a larger number of elements. As a result, unique handwritten characters can be correctly recognized for each writer.

Figure 3:
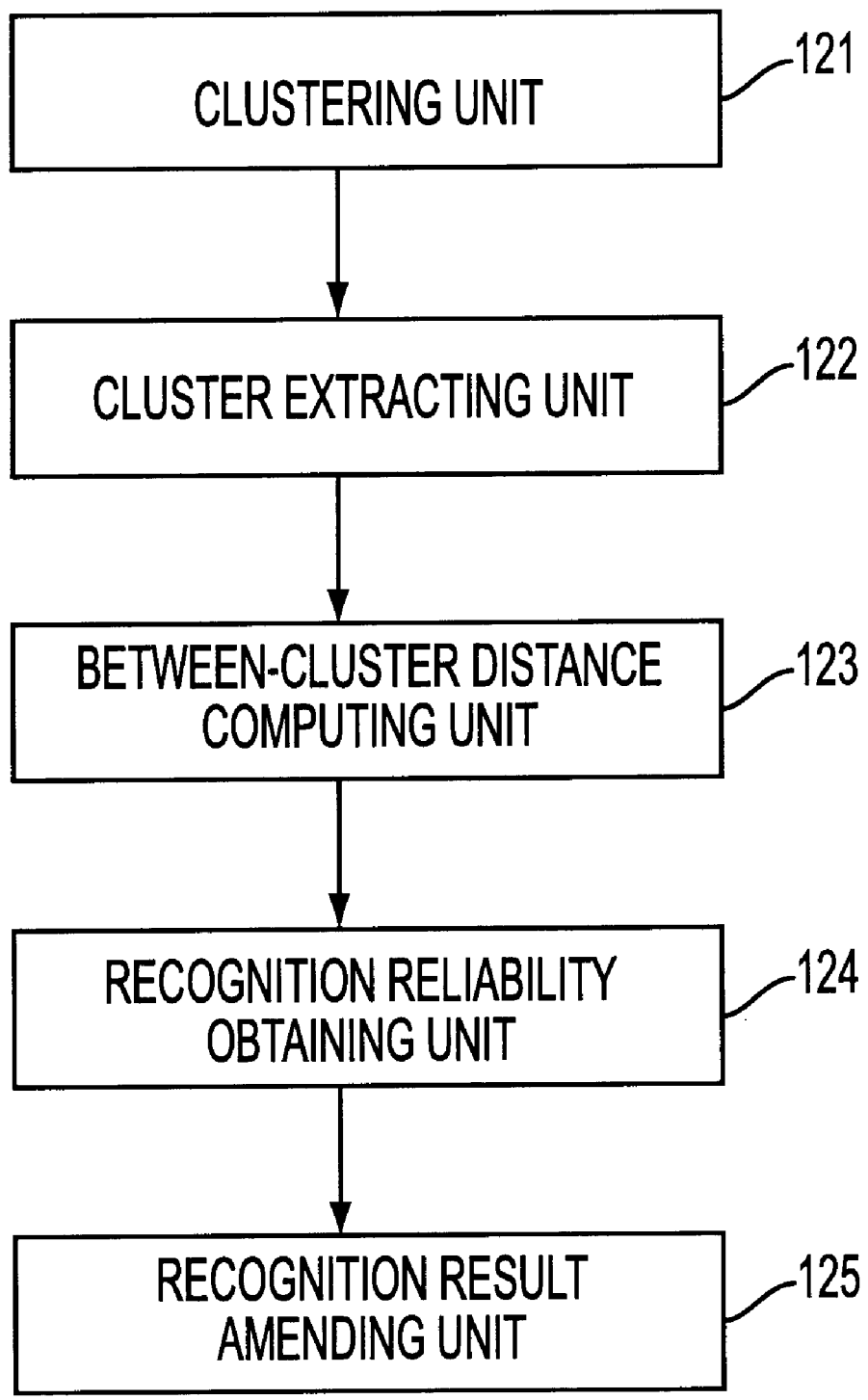
FIG. 3 is a block diagram showing the configuration of the processing unit functioning for each personal handwriting feature shown in FIG. 1.

FIG. 3 is a block diagram showing another example of the configuration of the personal handwriting characteristics process unit 104 shown in FIG. 1.

A clustering unit 121 generates a plurality of clusters, each of which contains handwritten character as elements, in each category by clustering the handwritten characters in each category.

A cluster extracting unit 122 extracts a cluster containing the number of elements smaller than a predetermined value from the clusters generated by the clustering unit 111.

A between-cluster distance computing unit 123 computes a between-cluster distance between the first cluster belonging to the first category extracted by the cluster extracting unit 112 and the second cluster belonging to the second category extracted by the clustering unit 111.

A recognition reliability obtaining unit 124 obtains the recognition reliability of each handwritten character.

A recognition result amending unit 125 integrates the first cluster into the second cluster when the between-cluster distance between the first and second clusters is smaller than the first predetermined value. From the integrated first and second clusters, the recognition result amending unit 125 extracts only a handwritten character in the first cluster whose recognition reliability is larger than the second predetermined value, and amends the first category containing the extracted handwritten character to the second category.

The recognition result amending unit 125 extracts the third cluster keeping a long between-cluster distance from other clusters in each category, and rejects the handwritten characters belonging to the third cluster.

Then, the recognition result amending unit 125 computes the distance between the rejected handwritten character and the cluster generated by the clustering unit 121. If there is the fourth cluster keeping a short distance from the rejected handwritten character, then the rejected handwritten character is integrated into the fourth cluster and the category of the rejected handwritten character is amended to the third category to which the fourth cluster belongs.

When the character recognition algorithm is implemented by the clustering method, the category of a recognized character is amended in consideration of the recognition reliability. Therefore, a handwritten character entered by the same writer can be recognized with a higher precision. A further practical recognizing process can be realized by changing a misrecognized character into a rejected character based on the recognition reliability, and by changing a rejected character into a recognizable character based on the rejection reliability.

The character recognition apparatus according to the second embodiment of the present invention is described below by referring to the attached drawings.

Figure 4:
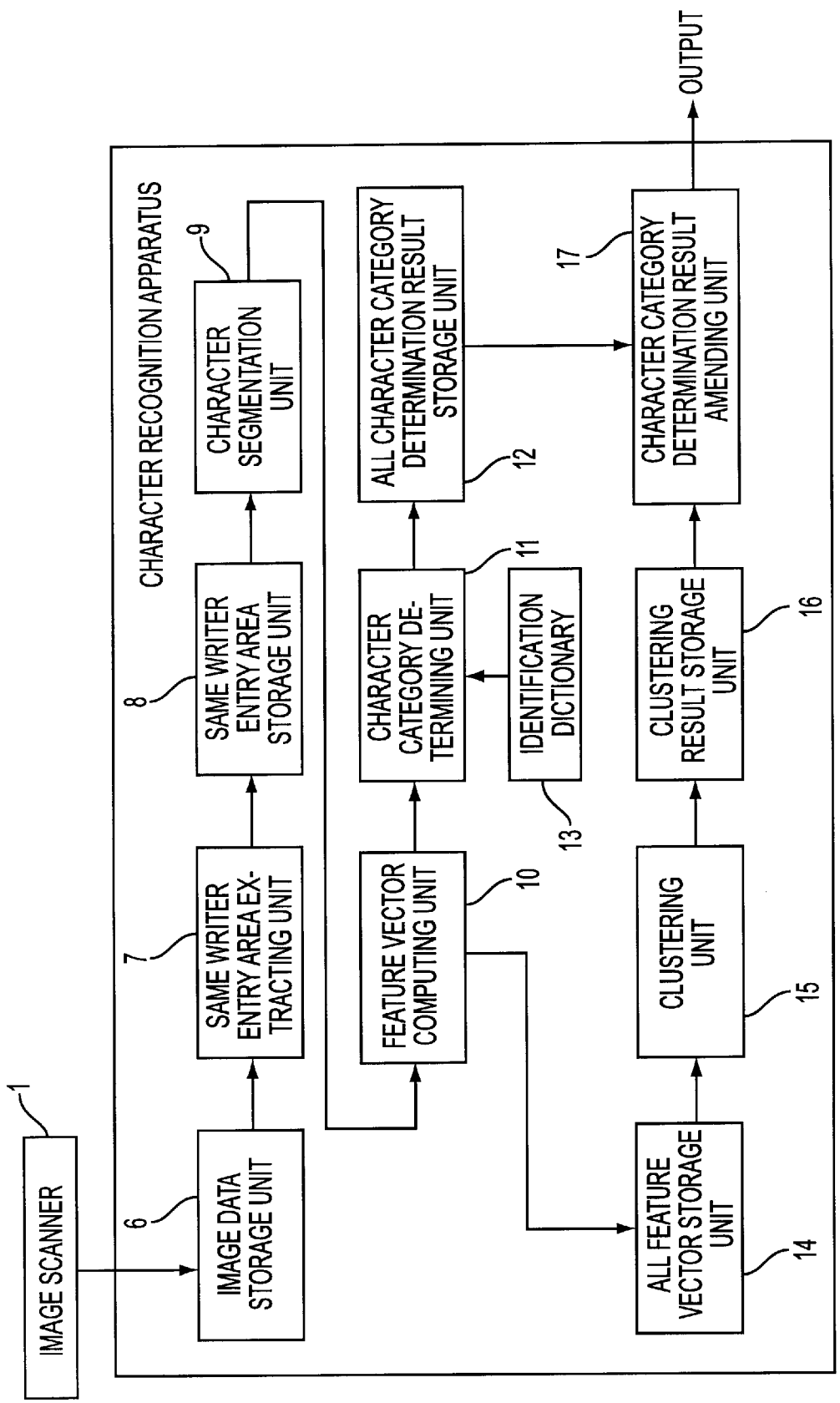
FIG. 4 is a block diagram showing the configuration of the character recognition apparatus according to the second embodiment of the present invention.

In FIG. 4, the character recognition apparatus for recognizing a handwritten character from image data in a document comprises an image data storage unit 6 storing image data in a document outputted from an image scanner 1; a same writer entry area extracting unit 7 (same writer entry area extracting means); a same writer entry area storage unit 8; a character segmentation unit 9; a feature vector computing unit 10 (feature vector computing means); a character category determining unit 11 (character category determining means); an all character category determination result storage unit 12; an identification dictionary 13; an all feature vector storage unit 14; a clustering unit 15 (clustering means); a clustering result storage unit 16; and a character category determination result amending unit 17 (character category determination result amending means).

That is, the character recognition apparatus of the second embodiment comprises the same writer entry area extracting unit 7 for extracting the area in which handwritten characters are entered by the same writer from the image data of the document; the feature vector computing unit 10 for computing the feature vector of each of all characters in the area extracted by the same writer entry area extracting unit 7; the character category determining unit 11 for determining the character category of each character based on the distance between the feature vector of each character computed by the feature vector computing unit 10 and the feature vector entered in the identification dictionary 13; the clustering unit 15 for performing a clustering process by sequentially integrating characters indicating high similarity to all feature vectors computed by the feature vector computing unit 10; and the character category determination result amending unit 17 for amending the character category determination result by comparing the clustering result obtained by the clustering unit 15 with the character category determination result obtained by the character category determining unit 11.

The character category determination result amending unit 17 compares the distance between clusters in all categories according to the process results from the clustering unit 15. The character category determination result amending unit 17 comprises a cluster integrating unit for integrating clusters whose between-cluster distance is shorter than a predetermined threshold; a within-cluster or an intra-cluster character category determining unit for determining whether or not the character categories of the clusters integrated by the cluster integrating unit are different from each other based on the determination results of all character categories determined by the character category determining unit 11; and a character category amending unit for amending the character category of one cluster containing a smaller number of elements to the character category of the other cluster containing a larger number of elements when these clusters have been integrated and it is determined by the within-cluster character category determining unit that the clusters contain character categories different from each other.

The clustering unit 15 can be designed to comprise a hierarchical clustering unit for sequentially integrating characters having high similarity in feature vector as a cluster by performing a hierarchical clustering process in character vector in a character category; and a clustering stop unit for stopping the hierarchical clustering process when the number of clusters in a category has reached a predetermined number by performing the hierarchical clustering process by the hierarchical clustering unit.

The clustering unit 15 can also be designed to comprise a hierarchical clustering unit for sequentially integrating characters having high similarity in feature vector as a cluster by performing a hierarchical clustering process in character vector in a character category; and a clustering stop unit for stopping the hierarchical clustering process when the between-cluster distance at the cluster integration has reached a predetermined threshold by performing the hierarchical clustering process by the hierarchical clustering unit.

Furthermore, the clustering unit 15 can also be designed to comprise a hierarchical clustering unit for sequentially integrating characters having high similarity in feature vector as a cluster by performing a hierarchical clustering process in character vector in a character category; and a clustering stop unit for stopping the hierarchical clustering process when the increase ratio of the between-cluster distance at the cluster integration has reached a predetermined threshold by performing the hierarchical clustering process by the hierarchical clustering unit.

Described below is the operation according to the embodiment shown in FIG. 4.

The image scanner 1 optically reads handwritten characters in a document, and generates and outputs binary image data. The image data outputted from the image scanner 1 is stored in the image data storage unit 6. Then, the same writer entry area extracting unit 7 extracts the image data in the area written by the same writer from the image data stored in the image data storage unit 6, and stores it in the same writer entry area storage unit 8.

Figure 5:
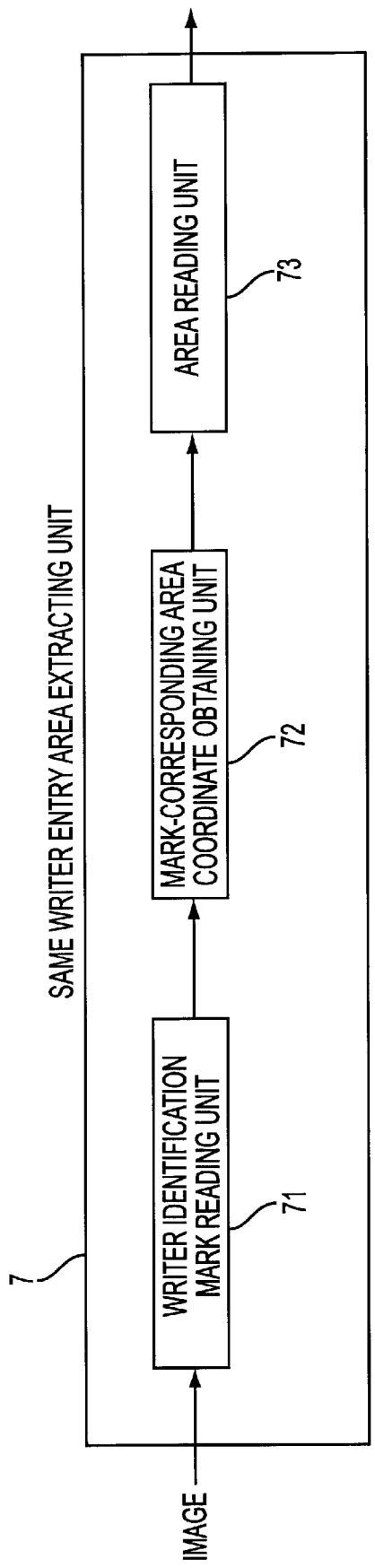
FIG. 5 is a block diagram showing an example of the configuration of the same writer entry area extracting unit shown in FIG. 4.

FIG. 5 is a block diagram showing an example of the configuration of the same writer entry area extracting unit 7.

In FIG. 5, a writer identification mark reading unit 71 reads a writer identification mark from the writer identification mark entry area, and discriminates the writer of the characters in the read image data.

A mark-corresponding area coordinate obtaining unit 72 obtains a coordinate indicating the same writer entry area covered by the writer identification mark.

An area reading unit 73 extracts the image data of the same writer entry area obtained by the mark-corresponding area coordinate obtaining unit 72.

Then, the character segmentation unit 9 detects a one-character area from the image data into which the same writer has entered data, and outputs it to the feature vector computing unit 10. The feature vector computing unit 10 computes the feature vector from the image data segmented by the character segmentation unit 9. At this time, the computed feature vector is stored in the all feature vector storage unit 14 and output to the character category determining unit 11.

The character category determining unit 11 determines the character category by referring to the identification dictionary 13 based on the feature vector computed by the feature vector computing unit 10, and stores the determination result in the all character category determination result storage unit 12. The clustering unit 15 performs a hierarchical clustering process on all feature vectors stored in the all feature vector storage unit 14 for each character category, and stored the clustering process results in the clustering result storage unit 16.

Then, the character category determination result amending unit 17 amends character category determining results based on the clustering results stored in the clustering result storage unit 16 and the all character category determination results stored in the all character category determination result storage unit 12, and then outputs an amendment result.

Since the character recognition result amending process is performed as described above based on the personal handwriting feature of each writer in addition to the functions of the conventional character recognition apparatus, characters can be correctly recognized. Furthermore, since the personal handwriting feature is computed based on a plurality of input characters, the process of preliminarily sampling characters for each writer is not required, and no memory is required for character samples. Additionally, the character recognition result amending process can be added as pre-processes to the processes performed by the conventional character recognition apparatus. Therefore, the conventional character recognition apparatus itself does not have to be changed, thereby easily implementing the second embodiment.

As another aspect of the second embodiment, the same writer entry area extracting unit 7 extracts an area, into which the same writer has written characters, based on the image data of the document stored in the image data storage unit 6. The feature vector computing unit 10 computes the feature vector of each character for all characters in the area extracted by the same writer entry area extracting unit 7. The character category determining unit 11 determines the character category of each character based on the distance between the feature of each character computed by the feature vector computing unit 10 and the feature vector entered in the identification dictionary 13.

The clustering unit 15 performs a clustering process by sequentially integrating characters having high similarity for all vectors computed by the feature vector computing unit 10 as a cluster. The character category determination result amending unit 17 amends the clustering result after comparing the clustering result obtained by the clustering unit 15 with the character category determination result obtained by the character category determining unit 11, and outputs the amendment result.

Since the character recognition result amending process is performed as described above based on the personal handwriting feature of each writer in addition to the functions of the conventional character recognition apparatus, characters can be correctly recognized. Furthermore, since the personal handwriting feature is computed based on a plurality of input characters, the process of preliminarily sampling characters for each writer is not required, and no memory is required for character samples. Additionally, the character recognition result amending process can be added as pre-processes to the processes performed by the conventional character recognition apparatus. Therefore, the conventional character recognition apparatus itself does not have to be changed, thereby easily implementing the second embodiment.

Additionally, since the clustering process is performed for each character category, the feature of a character indicating the personal handwriting feature can be easily captured, and the character mistakenly recognized in the conventional process can be easily amended.

As another aspect of the second embodiment, the cluster integrating unit in the character category determination result amending unit 17 compares the distances between clusters for all clusters of all categories based on the process results of the clustering unit 15, and integrates clusters whose between-cluster distances are smaller than the predetermined threshold. Then, the within-cluster character category determining unit determines whether or not the character categories in the clusters integrated by the cluster integrating unit are different from each other based on the all character category determination result obtained by the character category determining unit 11.

If it is determined by the within-cluster character category determining unit that the integrated clusters contain different character categories, then the character category amending unit amends the character category of the cluster containing a smaller number of elements to the character category of the cluster containing a larger number of elements.

In this case, the clustering process is performed for each character category, and the amending process is performed using the resultant data. Therefore, the feature of a character indicating the personal handwriting feature can be easily captured, and the character mistakenly recognized in the conventional process can be easily amended.

Since neighboring clusters are integrated step by step in the clustering process, it is likely to extract only a cluster located apart from others, and is likely to extract a cluster containing only misrecognized characters. Therefore, it is easy to amend misrecognized characters based on the clustering results.

As another aspect of the second embodiment, the hierarchical clustering unit of the clustering unit 15 sequentially integrates characters having high similarity in feature vector as a cluster by performing a hierarchical clustering process in character vector in a character category. The clustering stop unit stops the hierarchical clustering process when the number of clusters in a category has reached a predetermined number by performing the hierarchical clustering process by the hierarchical clustering unit.

Since the standard for stopping the clustering process is simple, the clustering stop unit can be easily added, thereby realizing a high-speed process.

As another aspect of the second embodiment, the hierarchical clustering unit of the clustering unit 15 sequentially integrates characters having high similarity in feature vector as a cluster by performing a hierarchical clustering process in character vector in a character category. The clustering stop unit stops the hierarchical clustering process when the between-cluster distance at the cluster integration has reached a predetermined threshold by performing the hierarchical clustering process by the hierarchical clustering unit. Since the clustering process is performed based on a between-cluster distance, a cluster can be correctly obtained.

As another aspect of the second embodiment, the hierarchical clustering unit of the clustering unit 15 sequentially integrates characters having high similarity in feature vector as a cluster by performing a hierarchical clustering process in character vector in a character category. The clustering stop unit stops the hierarchical clustering process when the increase ratio of the between-cluster distance at the cluster integration has reached a predetermined threshold by performing the hierarchical clustering process by the hierarchical clustering unit.

With the above described configuration, a cluster can be more correctly obtained depending on the distribution of the characters in the cluster because the increase ratio of the distance between clusters is used at the cluster integration even if the uneven distributions of the character feature vectors differ for each character category. As a result, a character category can be correctly amended at any time.

The third embodiment of the present invention is described below by referring to the attached drawings.

Figure 6:
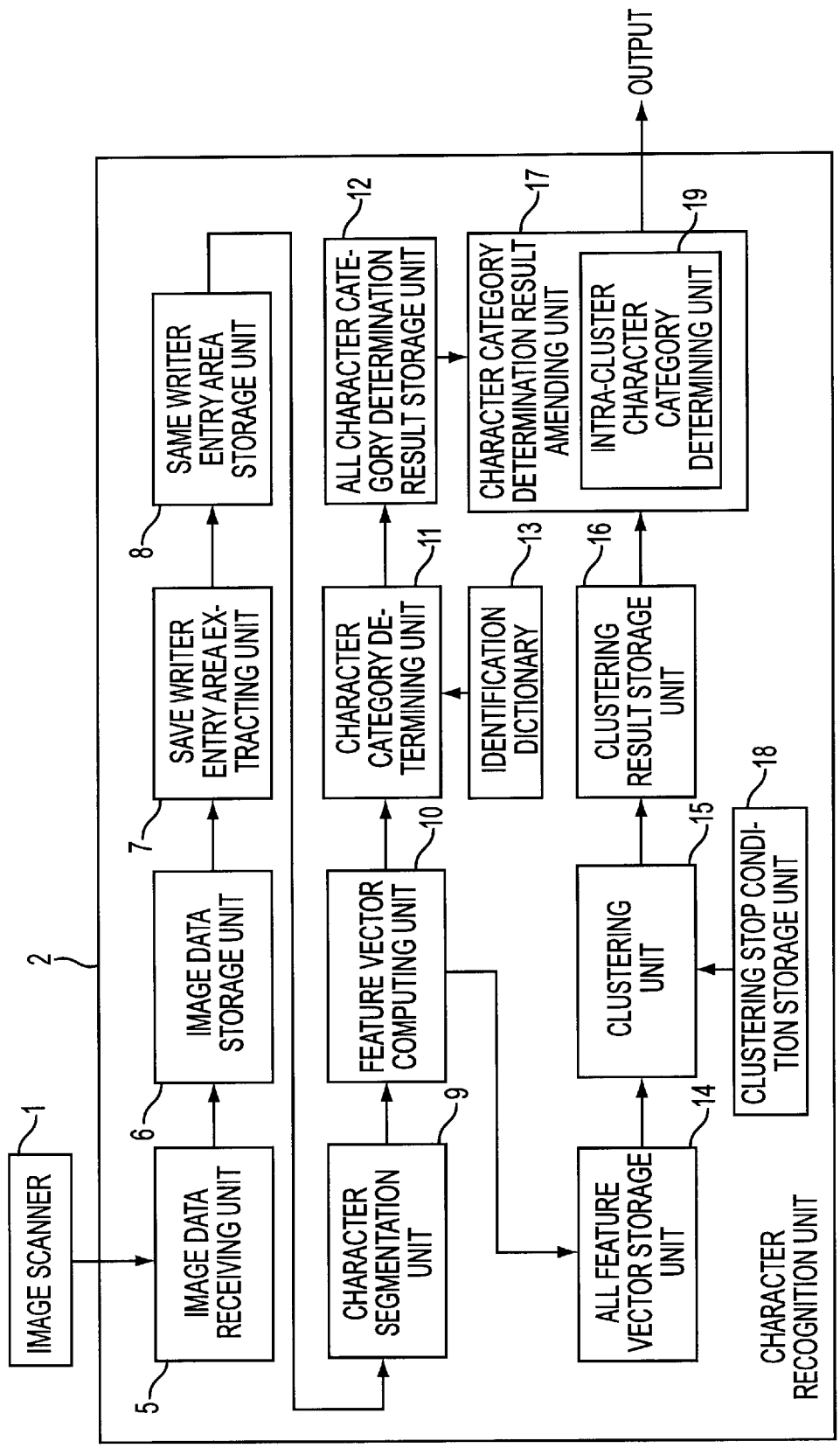
FIG. 6 is a block diagram showing the configuration of the character recognition apparatus according to the third embodiment of the present invention.

The image scanner 1 and the character recognition unit 2 are provided in the third embodiment shown in FIG. 6. In this embodiment, the image scanner 1 can be a scanner built in the character recognition apparatus (exclusive apparatus in hardware configuration), an independent scanner connectable to the character recognition apparatus (exclusive apparatus in hardware configuration) via a cable, a scanner built in a general-purpose information processing apparatus such as a personal computer, workstation, etc., and an independent scanner connectable to the above described general-purpose information processing apparatus via a cable.

The character recognition unit 2 can be a character recognition unit built in the above described character recognition apparatus (exclusive apparatus in hardware configuration) and a character recognition unit (handwritten character recognition software only) built in the information processing apparatus such as the personal computer, etc.

The character recognition unit 2 comprises an image data receiving unit 5; the image data storage unit 6; the same writer entry area extracting unit 7; the same writer entry area storage unit 8, the character segmentation unit 9; the feature vector computing unit 10; the character category determining unit 11; the all character category determination result storage unit 12; the identification dictionary 13; the all feature vector storage unit 14; the clustering unit 15; clustering result storage unit 16; the character category determination result amending unit 17; a clustering stop condition storage unit 18, etc. The character category determination result amending unit 17 comprises a within-cluster character category determining unit 19.

The image scanner 1 optically reads a document containing handwritten characters, and generates and outputs binary image data.

The character recognition unit 2 recognizes the handwritten characters in the character recognizing process from the image data outputted from the image scanner 1.

The image data receiving unit 5 receives the image data outputted from the image scanner 1 and stores the data in the image data storage unit 6.

The image data storage unit 6 is memory storing the image data outputted from the image scanner 1.

The same writer entry area extracting unit 7 extracts an area into which the same writer has written data from the image data stored in the image data storage unit 6. Then, it stores the extracted area in the same writer entry area storage unit 8.

The same writer entry area storage unit 8 is memory storing the image data in the same writer entry area extracted by the same writer entry area extracting unit 7.

The character segmentation unit 9 segments one-character data from the image data in the same writer entry area stored in the same writer entry area storage unit 8.

The feature vector computing unit 10 computes the feature vector of each character segmented by the character segmentation unit 9 for all characters stored in the same writer entry area storage unit 8.

The character category determining unit 11 determines the category of each character based on the distance between each feature vector computed by the feature vector computing unit 10 and the dictionary entry vector entered in the identification dictionary 13.

The all character category determination result storage unit 12 is memory storing the resultant data determined by the character category determining unit 11.

The identification dictionary 13 after stores a feature vector as a dictionary vector the feature vector of each category (for one character) is preliminarily computed using a learning pattern.

The all feature vector storage unit 14 is memory storing the feature vector of all categories (characters) computed by the feature vector computing unit 10.

The clustering unit 15 performs a clustering process (hierarchical clustering process) on all feature vectors computed by the feature vector computing unit 10.

The clustering result storage unit 16 is memory storing process result data from the clustering unit 15.

The character category determination result amending unit 17 compares the above described clustering process result with the character category of each character determined by the character category determining unit 11, and amends the character category determination result (amending a misrecognized character).

The clustering stop condition storage unit 18 is memory preliminarily storing clustering stop conditions.

The within-cluster character category determining unit 19 refers to all character categories stored in the all character category determination result storage unit 12, and determines for within-cluster character categories whether or not the character categories of integrated clusters match each other.

FIG. 7 shows the first document example containing handwritten characters to be processed, and FIG. 8 shows the second document example containing handwritten characters to be processed. A document containing handwritten characters to be read by the image scanner 1 can be, for example, the first document example shown in FIG. 7, the second document example shown in FIG. 8, etc. Since the clustering unit 15 performs a statistic process in the clustering process, these documents containing handwritten characters include a number of handwritten characters.

The first document example shown in FIG. 7 is used as, for example, a merchandise purchase form, etc., and has a 'purchase amount column', a 'writer number column', etc.

When the user uses this form, the user enters the writer number ('0321' in this example) in the 'writer number column', and enters the amount for each merchandise in the 'purchase amount column' in handwritten characters. In the first document example, a single writer enters amount values on a sheet of document.

The second document example shown in FIG. 8 is an example of a 'sales ledger', and is used when, for example, a plurality of merchandises are sold. This sales ledger contains columns of the product name, unit price, purchaser, quantity for each merchandise, and the records are entered in handwritten characters. The name of the person in charge "Taro Nippon" in handwritten characters is entered at the bottom of the sales ledger.

Since the clustering unit 15 performs a statistic process in the clustering process, these documents containing handwritten characters include more than a predetermined number of handwritten characters. It is assumed that the object image data in the character recognizing process has been preprocessed by removing noises, amending the pose of characters, etc. Furthermore, the character segmentation process is correctly performed character by character by the character segmentation unit 9.

The image scanner 1 optically reads a handwritten document, and generates and outputs binary image data. The image data output from the image scanner 1 is received by the image data receiving unit 5 and stored in the image data storage unit 6. Then, the same writer entry area extracting unit 7 extracts the image data in the area written to by the same writer from the image data stored in the image data storage unit 6, and stores the extracted data in the same writer entry area storage unit 8.

Then, the character segmentation unit 9 segments a one-character area from the image data in the area written to by the same writer and stored in the same writer entry area storage unit 8, and outputs the detected area to the feature vector computing unit 10. The feature vector computing unit 10 computes a feature vector from the image data segmented by the character segmentation unit 9. At this time, the computed feature vector is stored in the all feature vector storage unit 14 and output to the character category determining unit 11.

The character category determining unit 11 determines a character category by referring to the identification dictionary 13 based on the feature vector computed by the feature vector computing unit 10, and stores the determination result in the all character category determination result storage unit 12. The clustering unit 15 performs a hierarchical clustering process for each character category on all feature vectors stored in the all feature vector storage unit 14, and stores the clustering result in the clustering result storage unit 16 when the clustering process has been completed on all character categories.

Next, the character category determination result amending unit 17 amends the character category determination result (amending a misrecognized character category) based on the clustering result stored in the clustering result storage unit 16 and the category determination result of all characters stored in the all character category determination result storage unit 12, and then outputs the amendment result.

Described below in detail is the same writer entry area extracting unit 7.

The same writer entry area extracting unit 7 extracts the area written to by the same writer from the image data stored in the image data storage unit 6, and stores the extracted data in the same writer entry area storage unit 8. At this time, the image data in the document stored in the image data storage unit 6 can be: (1) the image data of a single writer generated by reading a document handwritten by the single writer; and (2) the image data of a plurality of writers generated by reading a document handwritten by the plurality of writers.

In the case (1) where the image data is generated from the document written by only a single writer, the same writer entry area extracting unit 7 reads all image data stored in the image data storage unit 6, and stores the data in the same writer entry area storage unit 8. In the case (2) where the image data is generated from the document written by a plurality of writers, the image data of a specified writer only is extracted and stored in the same writer entry area storage unit 8. In this case, the process is performed as follows.

In the case (1) where the image data is generated from the document written by only a single writer, the process can be performed by transmitting instruction information (entered by a person in charge through a keyboard) indicating that the image data is generated about a single writer to the same writer entry area extracting unit 7, and by internally setting the instruction information (for example, in memory). It can also be performed by inputting a writer number, etc. to a process object area.

In the case (2) where the image data is generated from the document written by a plurality of writers, the process can be performed by specifying extracted-area information for each writer for each object process area of the image data, and by extracting the area for each writer according to the specified instruction. Furthermore, the process can also be performed in the case (2) by entering a writer number in the document, reading the writer number from the image data generated by reading the document, identifying the entry area for each writer based on the writer number and the information about a predetermined area to be read, and extracting the same writer entry area. The process can also be performed by extracting the same writer entry area in other optional methods conventionally followed.

Described below in detail is the feature vector computing unit 10. The feature vector computing unit 10 computes the feature vector from the one-character area segmented by the character segmentation unit 9. There are various methods, for example, a weighing direction histogram method, of computing feature vectors.

The weighing direction histogram method is described in, for example, 'RECOGNITION OF HANDWRITTEN CHINESE CHARACTERS (KANJI) AND JAPANESE CHARACTERS (HIRAGANA) BY WEIGHING DIRECTION HISTOGRAM METHOD' in Electronic Information and Communications Academy Publication D, Vol. J70-D, No. 7, pp. 1390–1397, published in July, 1987. By the above described method of computing the feature vector, a 64-dimensional feature vector can be computed for each character.

Described below in detail is the character category determining unit 11. The character category determining unit 11 determines the category of a character by referring to the identification dictionary 13 based on the feature vector computed by the feature vector computing unit 10. In this case, a feature vector is preliminarily computed for each character category (category is indicated for each character) using a learning pattern and entered in the identification dictionary 13.

The character category determining unit 11 compares in distance the feature vector of an input character computed by the feature vector computing unit 10 with the feature vector of each category entered in the identification dictionary 13, and determines as the character category of the input character the category of the dictionary vector (feature vector entered in the identification dictionary 13) closest to the feature vector of the input character.

For the distance comparison method, refer to the above described document 'RECOGNITION OF HANDWRITTEN CHINESE CHARACTERS (KANJI) AND JAPANESE CHARACTERS (HIRAGANA) BY WEIGHING DIRECTION HISTOGRAM METHOD' in Electronic Information and Communications Academy Publication D, Vol. J70-D, No. 7, pp. 1390–1397, published in July, 1987'.

Figures 9A, 9B, 9C, 9D:
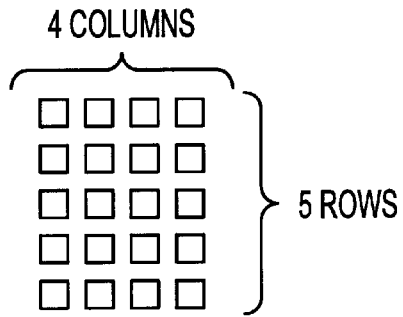
FIG. 9 shows an example of computing a feature vector according to an embodiment of the present invention.

FIG. 9 shows an example of computing a feature vector.

In this example, the character '2' is written in 20 cells (5 in columns by 4 in rows) as shown in FIG. 9(1). A black cell indicates '1', and a white cell indicates '0'. The cells are checked sequentially from top left to bottom right, and the values '1' and '0' are assumed to indicate feature vectors.

For example, the feature vector A shown in FIG. 9(2) is represented by vector A=(1,1,1,1,0,0,0,1,1,1,1,1,1,0,0,0,1,1,1,1). The feature vector B shown in FIG. 9(3) is represented by vector B=(0,1,1,1,0,0,0,1,1,1,1,1,1,0,0,0,1,1,1,1). The feature vector C shown in FIG. 9(4) is represented by vector C=(1,1,1,1,0,0,0,1,0,1,1,0,1,0,0,0,1,1,1,1).

FIG. 10 shows an example of computing the distance $D_{ij}$ between the feature vector from the city block distance d (i,j).

The city block distance d (i, j) is represented with the number of dimensions of the feature vector set as N, and the number of the feature vector set as i. The i-th feature vector $x_i$ is expressed by $x_i=(x_{i1}, x_{i2}, x_{i3}, \ldots, x_{iN})$, and the feature vector $x_j$ is expressed by $x_j=(x_{j1}, x_{j2}, x_{j3}, \ldots, x_{jN})$. The city block distance d (i, j) between the i-th feature vector $x_i$ and the j-th feature vector $x_j$ is represented by the following equation.

$$d\ (i,\ j)=|x_i-x_j|$$

Assume that, for example, the feature vectors of the character categories '1', '1', '3,' and '4' are entered in the identification dictionary 13 as shown in FIG. 10. In this example, the feature vector 1 of the character category of '1' is represented by vector 1=(0,1,1,0,0,1,1,0,0,1,1,0,0,1,1,0,0,1,1,0). The feature vector 2 of the character category of '2' is represented by vector 2=(1,1,1,1,0,0,0,1,1,1,1,1,1,0,0,0,1,1,1,1). The feature vector 3 of the character category of '3' is represented by vector 3=(1,1,1,1,0,0,0,1,1,1,1,1,0,0,0,1,1,1,1,1). The feature vector 4 of the character category of '4' is represented by vector 4=(1,0,1,0,1,0,1,0,1,1,1,1,0,0,1,0,0,0,1,0).

Assuming that an unknown character is input and its feature vector is represented by vector =(0,1,1,1,0,0,0,1,1,1,1,1,0,0,0,1,1,1,1,1), the city block distance d (i, j) between the feature vector and each of the feature vectors 1, 2, 3, and 4 of the character categories of '1', '2', '3', and '4' respectively entered in the identification dictionary 13 is computed by equation (2).

That is, the city block distance d (i, j) between the feature vector of an unknown character and the feature vector 1 of the character category of '1' is obtained by the following equation.

$$d\ (i,\ j)=|\text{vector}-\text{vector1}|=|0-0|+|1-1|+$$
$$|1-1|+|1-0|+|0-0|+|0-1|+|0-1|+|1-0|+|1-0|$$
$$+|1-1|+|1-1|+|1-0|+|1-0|+|0-1|+|0-1|+|0-0|+|1-0|+|1-1|+|1-1|+|1-0|=11$$

Similarly, the city block distance d (i, j) between the feature vector of an unknown character and the feature vector 2 of the character category of '2' is obtained by d (i, j)=|vector−vector2|=1. The city block distance d (i, j) between the feature vector of an unknown character and the feature vector 3 of the character category of '3' is obtained by d (i, j)=|vector−vector3|=3. The city block distance d (i, j) between the feature vector of an unknown character and the feature vector 4 of the character category of '4' is obtained by d (i, j)=|vector−vector4|=11.

Of the city block distances d (i, j) between the feature vector of the unknown character and the feature vectors 1, 2, 3, and 4 of the character categories of '1', '2', '3', and '4' respectively, the city block distance d (i, j) between the feature vector of the unknown character and the feature vector 2 of the character category of '2' indicates the smallest value.

Therefore, it is determined that the unknown character having the feature vector=(0,1,1,1,0,0,0,1,1,1,1,1,1,0,0,0,1,1,1,1) belongs to the character category of '2'.

The distance between the feature vectors in the feature space can also be computed by the Euclidean distance $|i-j|^2$, a discriminant function, etc. in addition to the city block distance $\Sigma |i-j|$.

The character category determining unit 11 determines the character category by referring to the identification dictionary 13 based on the above described feature vector computed by the feature vector computing unit 10, and stores the category determination result data for all characters in the all character category determination result storage unit 12.

Described below in detail is the clustering unit 15.

Figure 11:
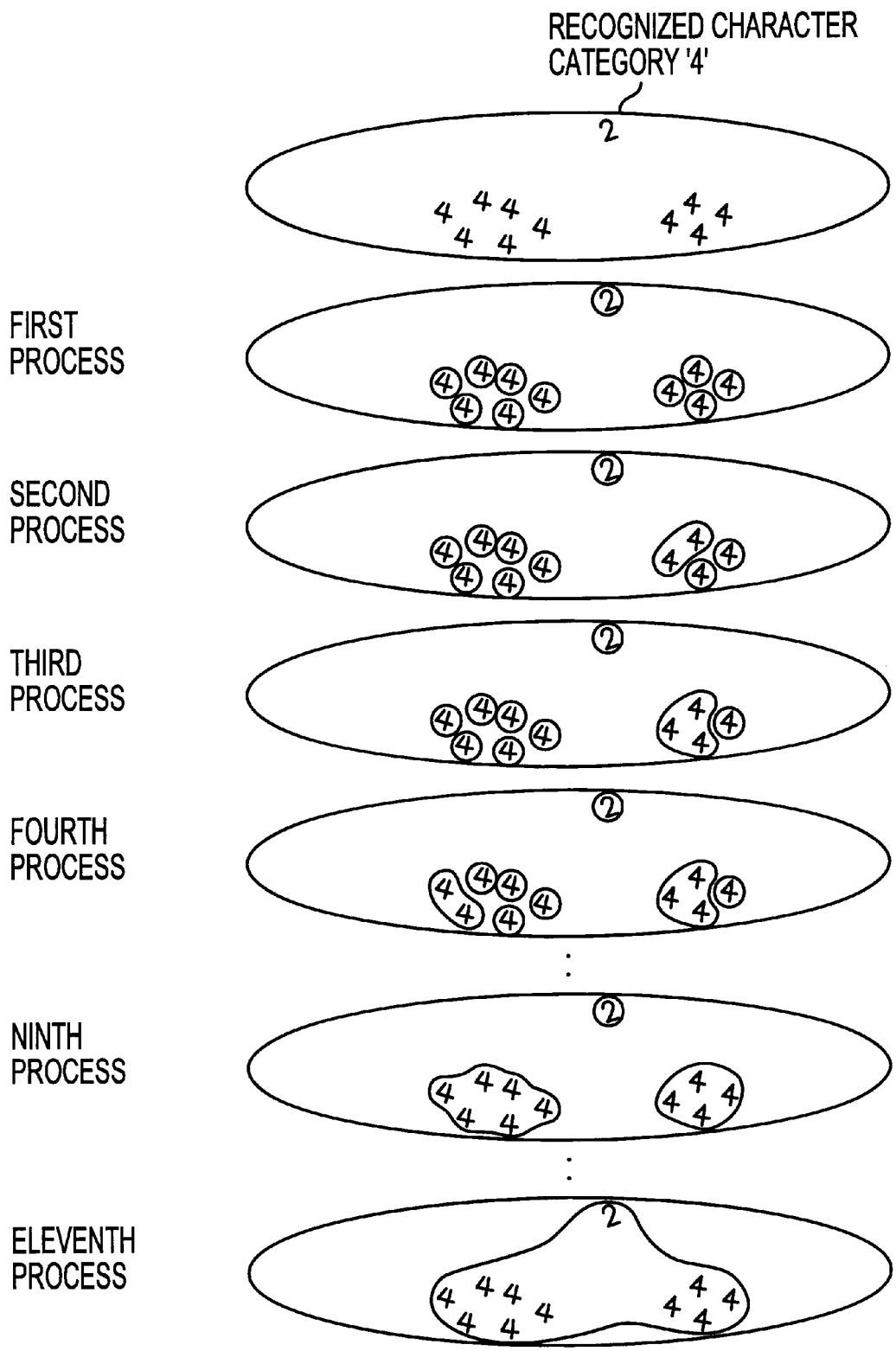
FIG. 11 shows the concept of the hierarchical clustering process according to an embodiment of the present invention.
Figure 12:
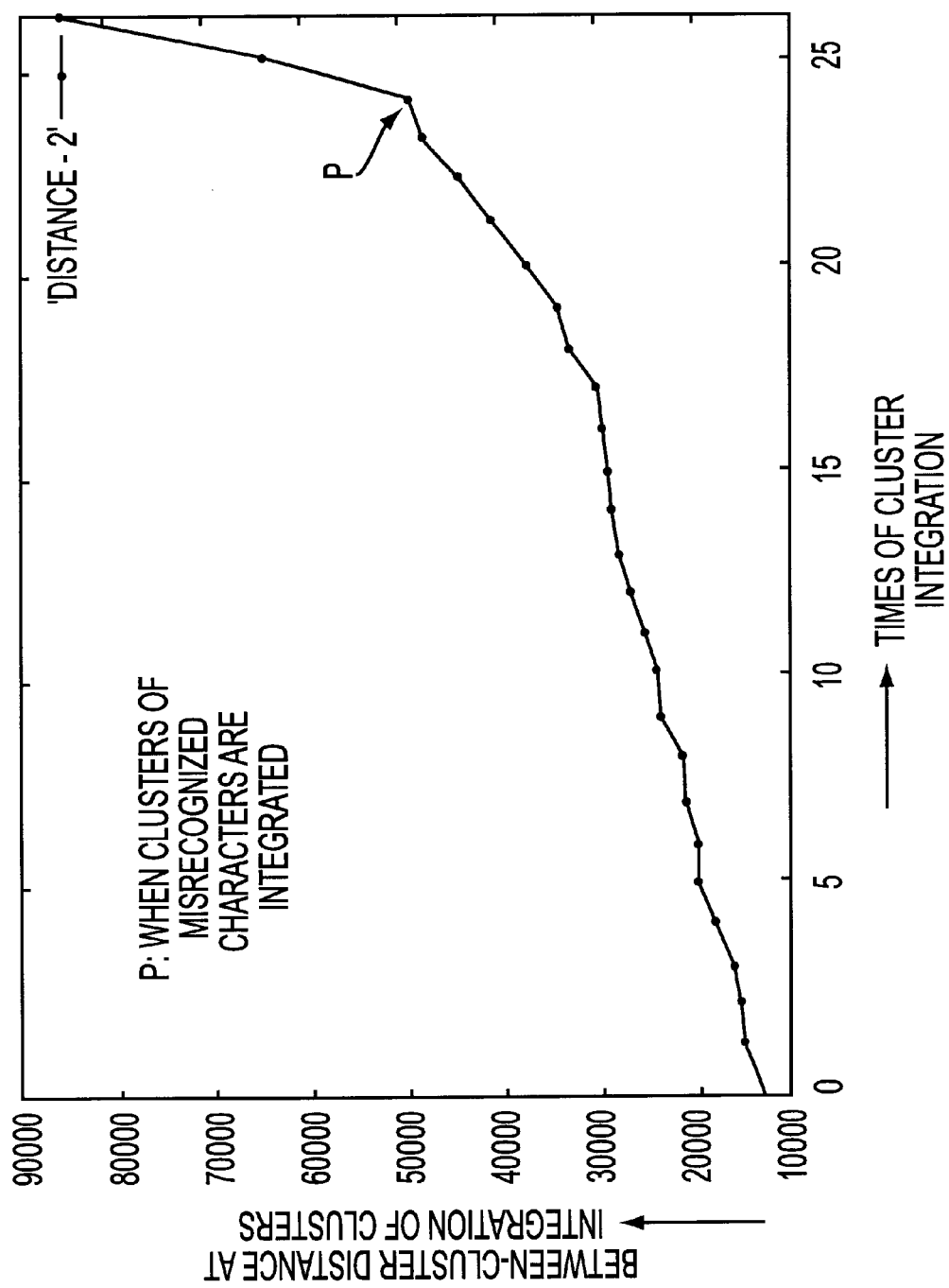
FIG. 12 shows the relationship between the times of cluster integration and the distance between the clusters when the clusters are integrated according to an embodiment of the present invention.

FIG. 11 show the concept of the hierarchical clustering process. FIG. 12 shows the relationship between the cluster integration time and the between-cluster distance when clusters are integrated. The clustering unit 15 performs a hierarchical clustering process for each character category on all feature vectors computed by the feature vector computing unit 10, and stores the clustering result in the clustering result storage unit 16 when the clustering processes have been completed on all character categories.

In the above described process, the clustering unit 15 reads a feature vector from the all feature vector storage unit 14, performs the clustering process based on the clustering stop conditions from the clustering stop condition storage unit 18, and stores the result of the clustering process in the clustering result storage unit 16.

In the above described hierarchical clustering process, it is assumed that each of the feature vectors is a cluster having a single variable, a new cluster is generated by integrating characters closest to each other in between-cluster distance, and similarly the integrating processes are further performed between characters closest to each other in between-cluster distance.

In the concept of the hierarchical clustering process shown in FIG. 11, a hierarchical clustering process is illustrated for the feature vector discriminated as the character category of '4'. In FIG. 11, one character '2' is mistaken for '4'. In this state, the first, second, third, fourth, . . . , eleventh hierarchical clustering processes are sequentially performed. When the clustering stop condition is satisfied, the clustering process terminates.

When clusters are integrated, the above described city block distance, for example, is used in comparing the distance between clusters containing one element, that is, between feature vectors. For example, the centroid method is used in comparing the distance between clusters containing a plurality of elements. In the centroid method, the vector xm representing the cluster is expressed by an average of the vectors in the cluster as follows.

$$xm = \frac{1}{M} \sum_{i=1}^{M} x_i \qquad (1)$$

where the i-th (i=1, 2, 3, . . . , M) feature vector $x_i$ of a cluster is represented by $x_i = (x_{i1}, x_{i2}, x_{i3}, \ldots, x_{iN})$.

Thus, the representative vectors are compared using the city block distance.

Since a misrecognized character cannot be found if the clustering process is completely performed as shown in FIG. 11, the above described clustering stop condition is set. The clustering stop condition is satisfied when:

(a) the final number of clusters is equal to or smaller than a predetermined value (for example, three);

(b) a between-cluster distance when the clusters are integrated exceeds a predetermined threshold; and (c) an increase ratio of a between-cluster distance when the clusters are integrated exceeds a predetermined threshold.

An optional clustering stop condition is selected from the above listed clustering stop conditions (a), (b), and (c), and is stored in the clustering stop condition storage unit 18. The clustering unit 15 performs a clustering process by referring to the above listed stop condition.

The 'threshold of the between-cluster distance' under the above listed clustering condition can be, for example, the value obtained by multiplying the minimum distance between dictionary entry vectors by ⅓. That is, the following equation can be expressed.

$$L_{min} = \min (|J_i - J_j|)(i=0, 1, \ldots, 9, i \neq j), L_t h = \frac{1}{3} L_{min}$$

where $J_i$(i=0, 1, 2, . . . , 9) indicates a dictionary entry vector;

$L_{min}$ indicates the minimum distance between the dictionary entry vectors; and $L_t h$ indicates a threshold.

Regarding the between-cluster distance increase ratio under the above listed clustering stop condition (c), close clusters are sequentially integrated in a hierarchical clustering process, then the between-cluster distance gradually increases when the clusters are integrated. The cluster of misrecognized characters is positioned apart when compared with the cluster of correctly recognized characters. Therefore, the increase ratio of the between-cluster distance rises higher when a cluster of correctly recognized characters is integrated into a cluster of misrecognized characters than when clusters of correctly recognized characters are integrated.

The clustering process is stopped immediately before the between-cluster distance increase ratio rises. Relating to the threshold, it is stopped when the between-cluster distance increase ratio exceeds three times the increase ratio obtained at the previous integration.

In FIG. 12, the horizontal axis indicates the time of integrating clusters (time of cluster integrations), and the vertical axis indicates the between-cluster distance at the cluster integration. The point P indicates the point when a cluster of misrecognized characters is integrated (when a cluster of correctly recognized characters is integrated into a cluster of misrecognized characters). As shown in FIG. 12, the between-cluster distance increases as the hierarchical clustering process proceeds, and the between-cluster distance suddenly increases when a misrecognized character is integrated (refer to the point P shown in FIG. 12).

That is, assuming that di indicates the between-cluster distance at the i-th cluster integration, the clustering stop condition is expressed as follows.

$$(d_{i+1} - d_i)/(d_i - d_{i-1}) > 3$$

Figure 13:
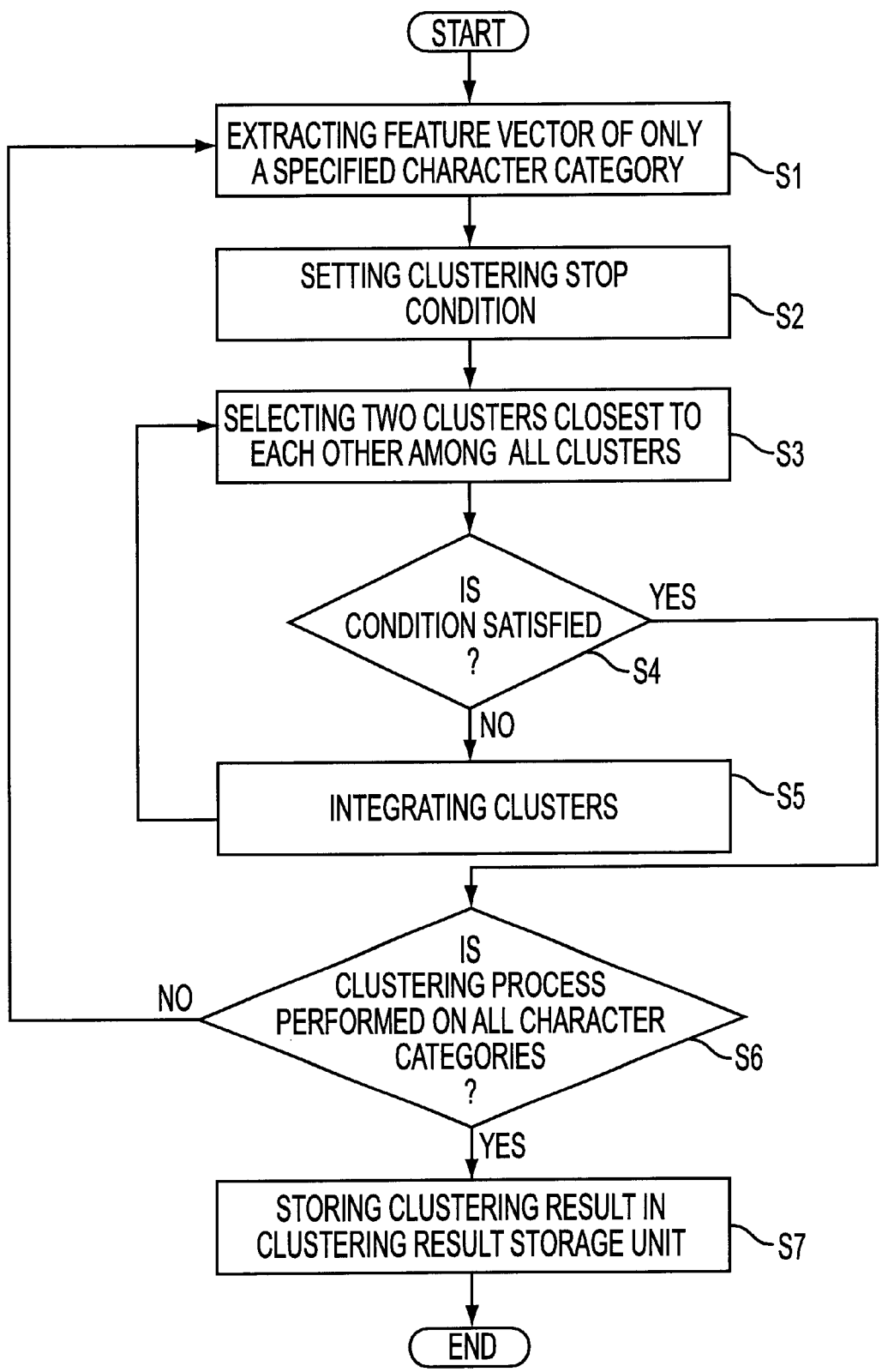
FIG. 13 is a flowchart showing the hierarchical clustering process according to an embodiment of the present invention.

FIG. 13 is a flowchart showing the clustering process.

The clustering unit 15 retrieves a feature vector from the all feature vector storage unit 14 and starts a clustering process. In the clustering process, only the feature vector of a character category is extracted (S1). The clustering unit 15 then fetches the clustering stop condition from the clustering stop condition storage unit 18, and sets the condition in the clustering unit 15 (S2).

Then, the clustering unit 15 selects two clusters closest to each other in all clusters (each feature vector is regarded as a cluster containing a single element) of all feature vectors stored in the all feature vector storage unit 14 (S3).

The clustering unit 15 determines whether or not the clustering stop condition is satisfied (S4). If it is not satisfied, the clusters are integrated (S5) and the processes are repeated from the process of S3 again.

When the clustering stop condition is satisfied in the process in S4, it is determined whether or not the clustering process has been performed on all character categories (S6). If the clustering process has not been performed on all character categories, then the processes are repeated from the process in S1 (process on the subsequent process). Thus, if the clustering process has been performed on all character categories, the clustering results are stored in the clustering result storage unit 16 (S7), and the clustering process terminates.

Next, the character category determination result amending unit 17 is described in detail.

Figure 14:
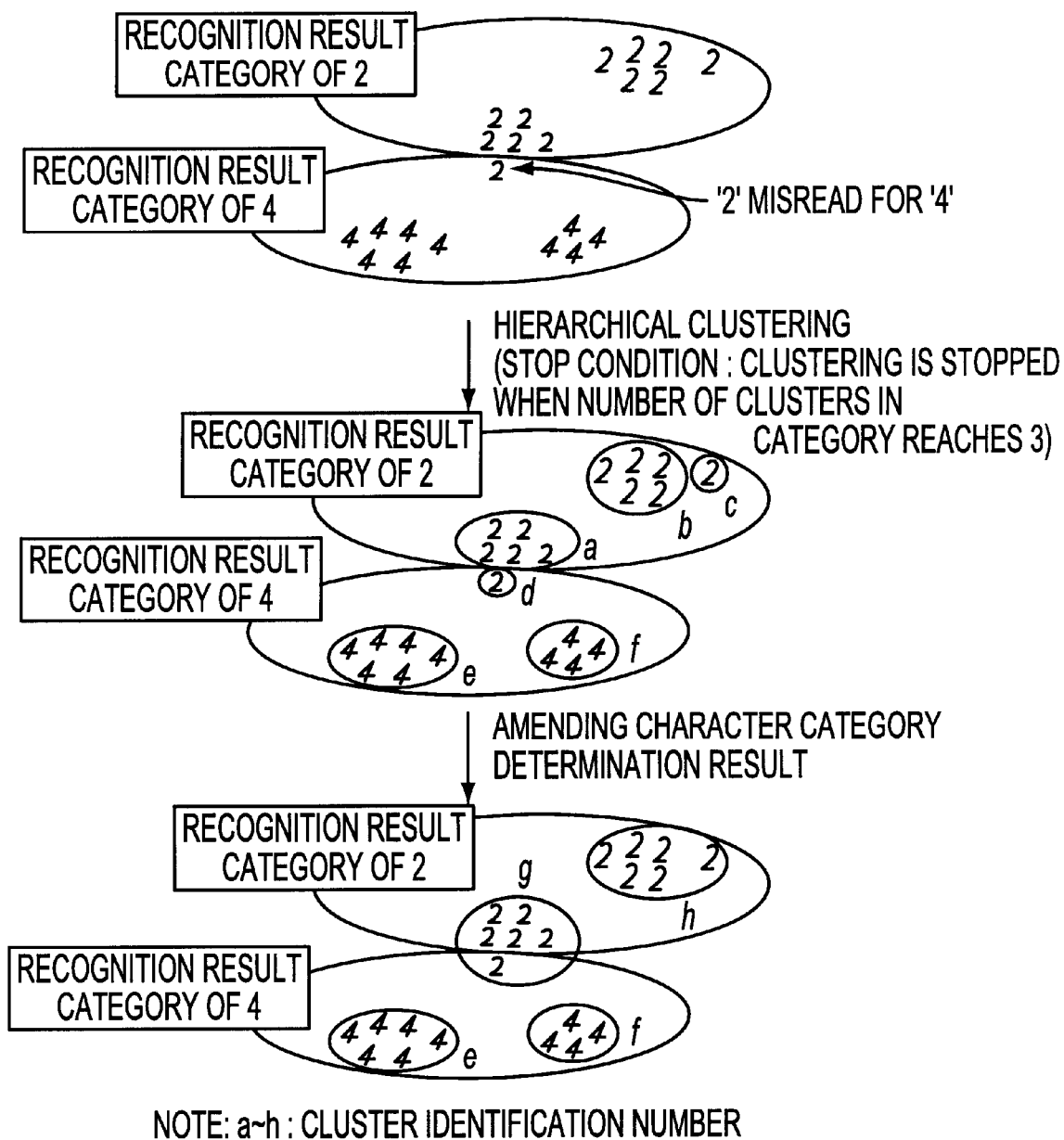
FIG. 14 shows the concept of the hierarchical clustering process and character category discriminating process according to an embodiment of the present invention.

FIG. 14 shows the concept of the hierarchical clustering process and the character category determination result amending process. The character category determination result amending unit 17 amends the character category determination result based on the clustering result stored in the clustering result storage unit 16 and the category determination result of all characters stored in the all character category determination result storage unit 12.

When the character category determination result amending unit 17 amends the character category determination result, it computes the between-cluster distance for each pair of clusters in all clusters (data stored in the clustering result storage unit 16) of all categories obtained by the clustering unit 15.

If the computed between-cluster distance is smaller than a predetermined threshold, the corresponding clusters are integrated. At this time, the within-cluster character category determining unit 19 refers to the category determination result of all characters stored in the all character category determination result storage unit 12, and determines whether or not the character categories of the integrated clusters match each other. As a result, if the categories of the clusters do not match each other, then the character category determination result amending unit 17 amends the character category of the cluster containing a smaller number of elements to the character category of the cluster containing a larger number of elements.

The threshold of the between-cluster distance at the cluster integration can be, for example, a multiple of a constant of the between-cluster distance in the cluster containing a larger number of elements. That is, the following processes are performed to determine whether or not cluster A (the number of elements=M) is integrated into cluster B (the number of elements=N) (M>N). Assuming that xam indicates the average vector of cluster A, xbm indicates the average vector of cluster B, and that xai indicates the feature vector in cluster A (i=1, 2, . . . , M), M is larger than N (M>N) and the between-cluster distance $d_ih$ in cluster A is expressed by the following equation.

$$d_i h = \frac{1}{M} \sum_{i=1}^{M-1} \sum_{\substack{j=i+1 \\ j \neq i}}^{M} |xa_i - xa_j| \quad (2)$$

The condition of integrating clusters is represented as follows.

$$|xam - xbm| < 1.5 \, d_i h$$

where the constant is 1.5.

Next, the above described process is clearly explained by referring to FIG. 14. The characters a, b, c, d, e, f, g, and h shown in FIG. 14 are identification numbers (symbols). In this example, the hierarchical clustering stop condition is to stop clustering 'when the number of elements in each category reaches 3'. First, the character category determination result amending unit 17 continues the clustering process for feature vectors until the number of clusters becomes 3 in each category.

Then, the character category determination result amending unit 17 integrates clusters close to each other in between-cluster distance. In this example, cluster b is integrated into cluster c to make cluster h. Since the character categories of clusters b and c are '2', each character category is not amended in the cluster integration.

Cluster a is integrated into cluster d to make cluster g. The character category of cluster a is '2' while the character category of cluster d is '4'. Since the character categories of clusters a and d are different from each other and the number of elements in cluster a is larger than the number of elements in cluster d, the character category of cluster d is amended from '4' to '2'.

Figure 15:
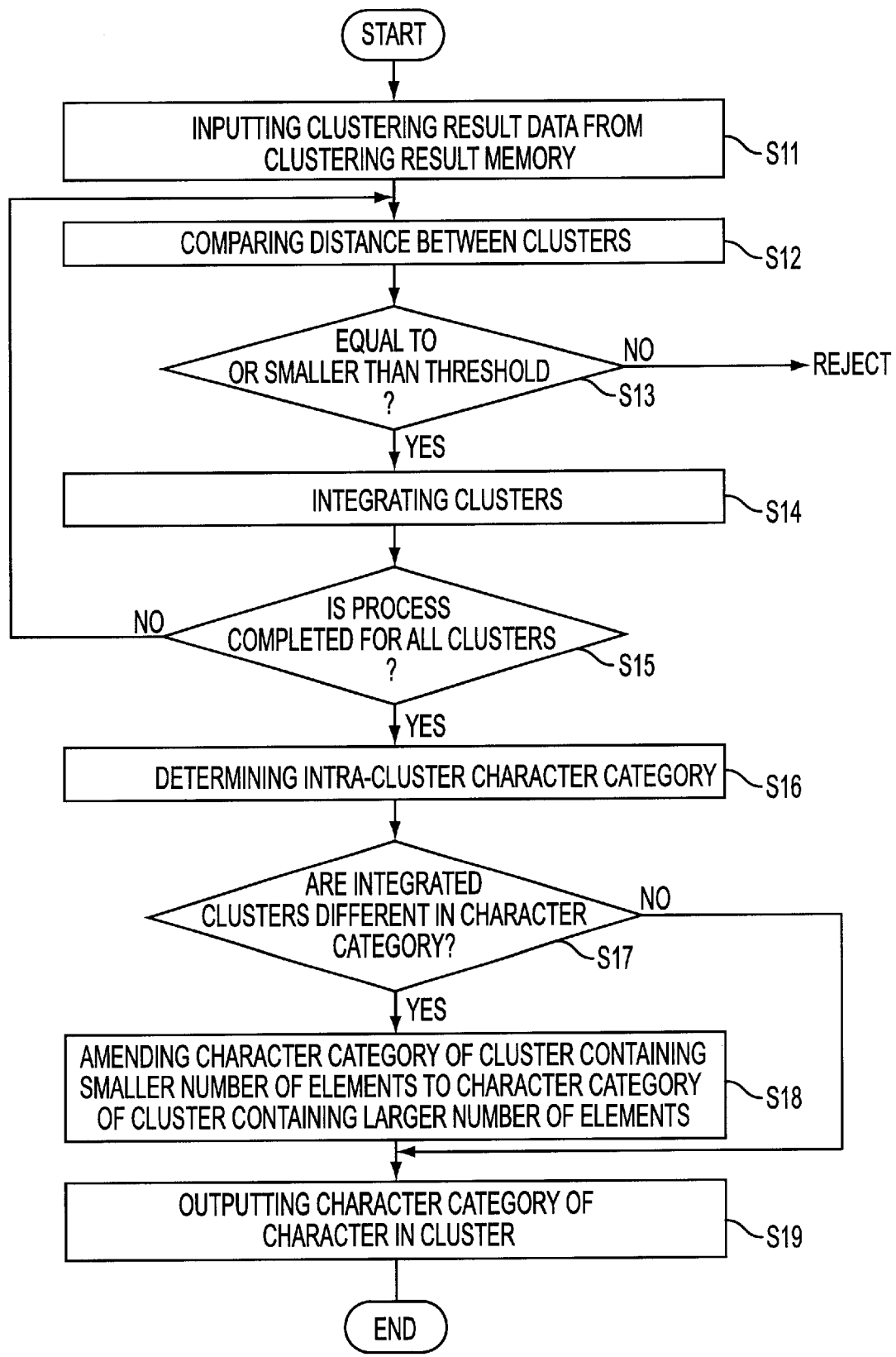
FIG. 15 is a flowchart showing the character category discrimination result amending process.

FIG. 15 is a flowchart showing the process of amending a character category determination result.

When the character category determination result amending unit 17 amends the determination result of a character category, it receives clustering result data from the clustering result storage unit 16 (S11). Then, it computes and compares the between-cluster distance between each pair of clusters in all clusters of all categories obtained by the clustering unit 15 (S12).

As a result, it is determined whether or not the computed between-cluster distance is smaller than a predetermined threshold (S13). If the between-cluster distance is not equal to or smaller than the predetermined threshold, then no action is taken (rejection). If the computed between-cluster distance is equal to or smaller than the threshold, then the corresponding clusters are integrated (S14). If the processes have not been performed on all clusters, then the processes are repeated in S15 from the process in S12.

At this time, the within-cluster character category determining unit 19 refers to the category determination results of all characters stored in the all character category determination result storage unit 12 and determines the character category in a cluster (S16). Then, it determines whether or not the character categories of the integrated clusters are different from each other (S17).

As a result, if the categories of the clusters are different from each other, then the character category determination result amending unit 17 amends the character category of the cluster containing a smaller number of elements to the character category of the cluster containing a larger number of elements (S18), and outputs the character category for each character in the cluster. If the character categories of the clusters integrated in the process in S17 are not different from each other, the character category determination result amending unit 17 outputs the character category to each character in the clusters (S19).

Since, as described above, the character recognition apparatus shown in FIG. 6 computes the personal handwriting feature based on a plurality of input characters, a process of preliminarily sampling characters for each writer is not required, or conventional memory for storing character samples is not required, either.

Furthermore, since an amending process can be added as a preprocess to various conventionally-suggested character recognizing processes, the conventional character recognizing processes do not have to be amended, thereby easily implementing the amending process.

Since the clustering process is performed for each character category, the feature of a character reflecting the personal handwriting feature can be easily captured, and a character mistakenly recognized in the conventional processes can be easily amended. Additionally, since contiguous clusters are integrated step by step in the hierarchical clustering process, it becomes easier to extract only clusters positioned apart, thereby easily extracting a cluster containing misrecognized characters only. Similarly, a rejection is determined based on the between-cluster distance even if a misrecognized character cannot amended to a correctly recognized character.

Described below is the character recognition apparatus according to the fourth embodiment of the present invention.

Figure 16:
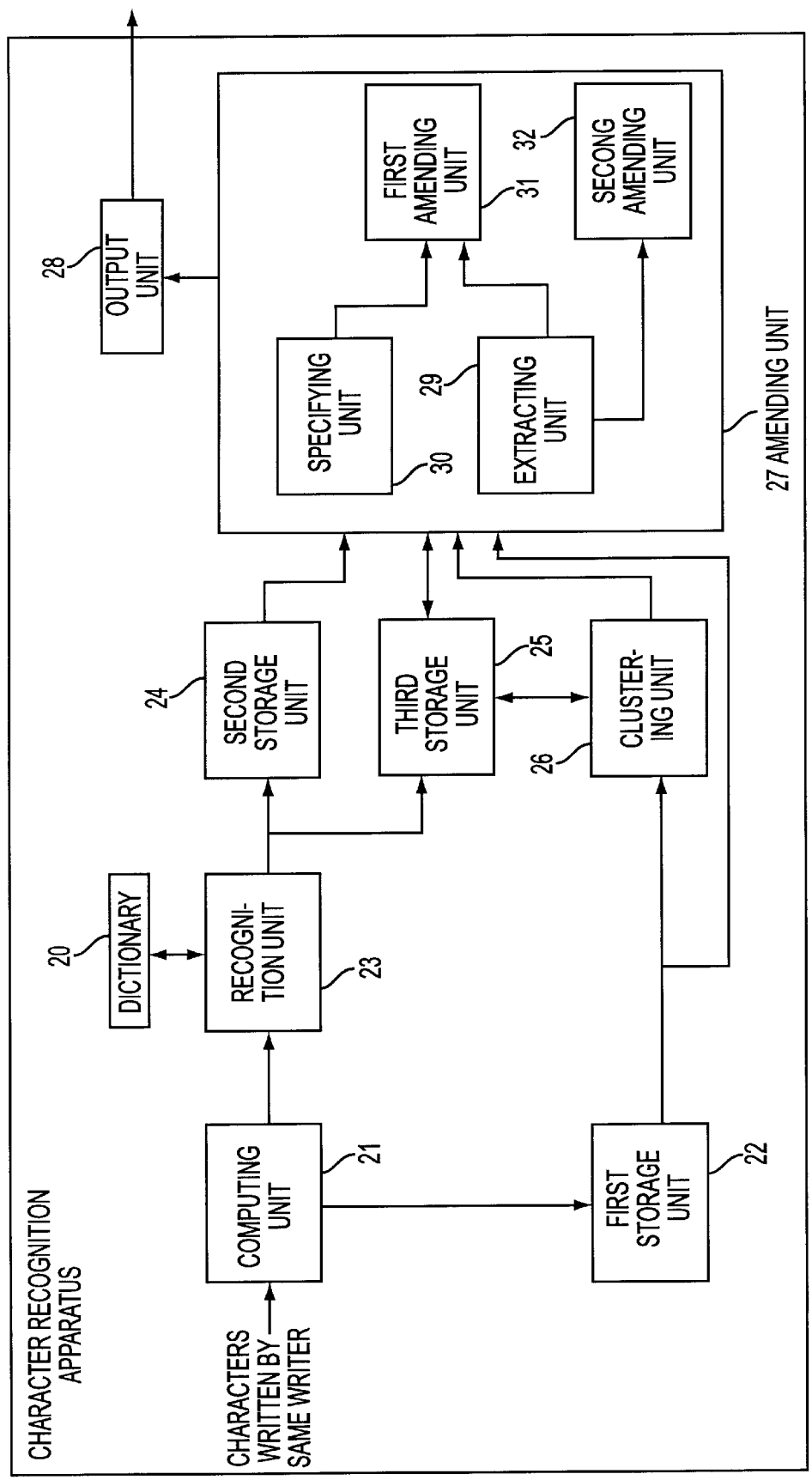
FIG. 16 is a block diagram showing the configuration of the character recognition apparatus according to the fourth embodiment of the present invention.

In FIG. 16, the character recognition apparatus recognizes character categories of a number of input characters input by the same writer, and comprises a dictionary 20, a computing unit 21, a first storage unit 22, a recognition unit 23, a second storage unit 24, a third storage unit 25, a clustering unit 26, an amending unit 27, and an output unit 28.

The dictionary 20 manages the feature vector of each character category. The computing unit 21 computes the feature vector of an input character. The first storage unit 22 stores the feature vector computed by the computing unit 21 corresponding to the input character.

The recognition unit 23 computes the distance value between the feature vector computed by the computing unit 21 and the feature vector of each character category entered in the dictionary 20, recognizes the character category indicating the smallest distance value as the character category of the input character, and rejects the input character as unrecognizable when the distance value to the recognized character category is not equal to or not smaller than a predetermined value.

The second storage unit 24 stores the distance value computed by the recognition unit 23 between the input character and the recognized character category corresponding to the input character. The third storage unit 25 stores the character category recognized by the recognition unit 23 corresponding to the input character.

The clustering unit 26 generates one or more clusters for each character category by clustering the feature vector computed by the computing unit 21 for each character category recognized by the recognition unit 23.

The amending unit 27 amends the recognition result of the recognition unit 23 stored in the third storage unit 25, and comprises an extracting unit 29 for extracting a cluster which can be misrecognized with a high possibility from the clusters generated by the clustering unit 26; a specifying unit 30 for specifying the cluster belonging to another character category and closest to the cluster extracted by the extracting unit 29 using the feature vector computed by the computing unit 21, or for specifying the cluster belonging to another character category and closest to the input character rejected by the recognition unit 23; a first amending unit 31 for amending the recognized character category of an input character belonging to the cluster extracted by the extracting unit 29, amending a rejected input character to a recognizable character, and setting the category or the recognizable character; and a second amending unit 32 for amending the input character belonging to the cluster extracted by the extracting unit 29 to a rejected character.

The output unit 28 externally outputs the recognition result recognized by the recognition unit 23 and amended by the amending unit 27.

The clustering unit 26 of the character recognition apparatus configured as described above generates one or more clusters for each character category by clustering the feature vector computed by the computing unit 21 for each character category recognized by the recognition unit 23.

For example, the clustering unit 26 first generates a cluster by performing a clustering process by a hierarchical clustering method, and then generates one or more clusters for each character category by performing a clustering process by a non-hierarchical clustering method using the first generated cluster as an initial state.

After one or more clusters have been generated, the extracting unit 29 extracts a cluster which can be misrecognized with a high possibility by extracting, for example, a cluster containing a number of input characters smaller than a predetermined number from the generated clusters. As a result, the specifying unit 30 specifies, using the feature vector computed by the computing unit 21, the cluster belonging to another character category and closest to the extracted cluster which can be misrecognized at a highest possibility.

At this time, the specifying unit 30 may preliminarily limit another character category to be specified depending on the character category of the extracted cluster which can be misrecognized with a high possibility so that the specifying process can be performed correctly and at a high speed. It may also limit another character category to be specified to a high order character category indicating a smaller distance value computed by the recognition unit 23.

When the distance value between the extracted cluster which can be misrecognized with a high possibility and the cluster belonging to another character category specified by the specifying unit 30 and closest to the extracted cluster is smaller than a predetermined value, the first amending unit 31 amends the recognized character category of an input character belonging to the extracted cluster which can be misrecognized with a high possibility and indicating the distance value from the recognized character category larger than a predetermined value to the character category of the cluster specified by the specifying unit 30.

That is, when a cluster which can be misrecognized with a high possibility is extracted, the cluster belonging to another character category and closest in distance to the extracted cluster is specified. If the similarity to the extracted cluster is high, the recognized character category of the input characters having low recognition reliability contained in the cluster which can be misrecognized with a high possibility is amended to the recognized character category of the cluster close in distance to the category of the extracted cluster.

The second amending unit 32 amends an input character belonging to the extracted cluster which can be misrecognized with a high possibility to a rejected character when the distance values between the extracted cluster which can be misrecognized with a high possibility and all clusters of the categories of all other characters are larger than a predetermined value.

That is, if a cluster which can be misrecognized with a high possibility is extracted and the cluster is not similar to any of all clusters of the categories of all other characters, then the input character belonging to the cluster which can be misrecognized with a high possibility is amended to a rejected character.

On the other hand, the specifying unit 30 specifies the cluster of the category of a character closest in distance to the input character rejected by the recognition unit 23 using the feature vector computed by the computing unit 21.

At this time, the specifying unit 30 may preliminarily limit another character category to be specified depending on the recognized character category of the rejected character so that the specifying process can be performed at a high speed. It also may limit another character category to be specified to a high order character category indicating a small distance value computed by the recognition unit 23.

When the distance value between the cluster of the rejected input character and the cluster belonging to another character category specified by the specifying unit 30 as closest to the rejected input character is smaller than a predetermined value, the first amending unit 31 amends a rejected input character indicating the distance value from the recognized character category smaller than a predetermined value to a recognizable character, and sets the recognized character category of the input character as the character category of the cluster specified by the specifying unit 30.

That is, if the cluster of the category of a character close to the rejected input character is specified, the similarity is high, and the rejection reliability of the rejected input character is low, then the rejected input character is amended to a recognizable character and the recognized character category of the rejected input character is set as the character category of the cluster closest to the rejected input character.

Thus, according to the fourth embodiment, the feature vector of an input character is clustered to generate a cluster, a cluster which can be misrecognized with a high possibility is extracted from the cluster, and a cluster belonging to another character category and closest to the extracted cluster is specified. If the similarity is high, the recognized character category of the input character contained in the cluster which can be misrecognized with a high possibility and indicates a low recognition reliability is amended to the character category of the similar cluster. Therefore, a handwritten character recognizing process can be correctly performed without preliminarily collecting character samples.

When the cluster which can be misrecognized with a high possibility is not similar to all clusters of the categories of all other characters, the input character belonging to the cluster which can be misrecognized with a high possibility is amended to a rejected character. As a result, the handwritten character recognizing process can be correctly performed.

That is, if the cluster of the category of a character close to the rejected input character is specified, the similarity is high, and the rejection reliability of the rejected input character is low, then the rejected input character is amended to a recognizable character and the recognized character category of the rejected input character is set as the character category of the cluster similar to the rejected input character. As a result, the handwritten character recognizing process can be correctly performed.

Described below is the configuration of the system of the character recognition apparatus.

Figure 17:
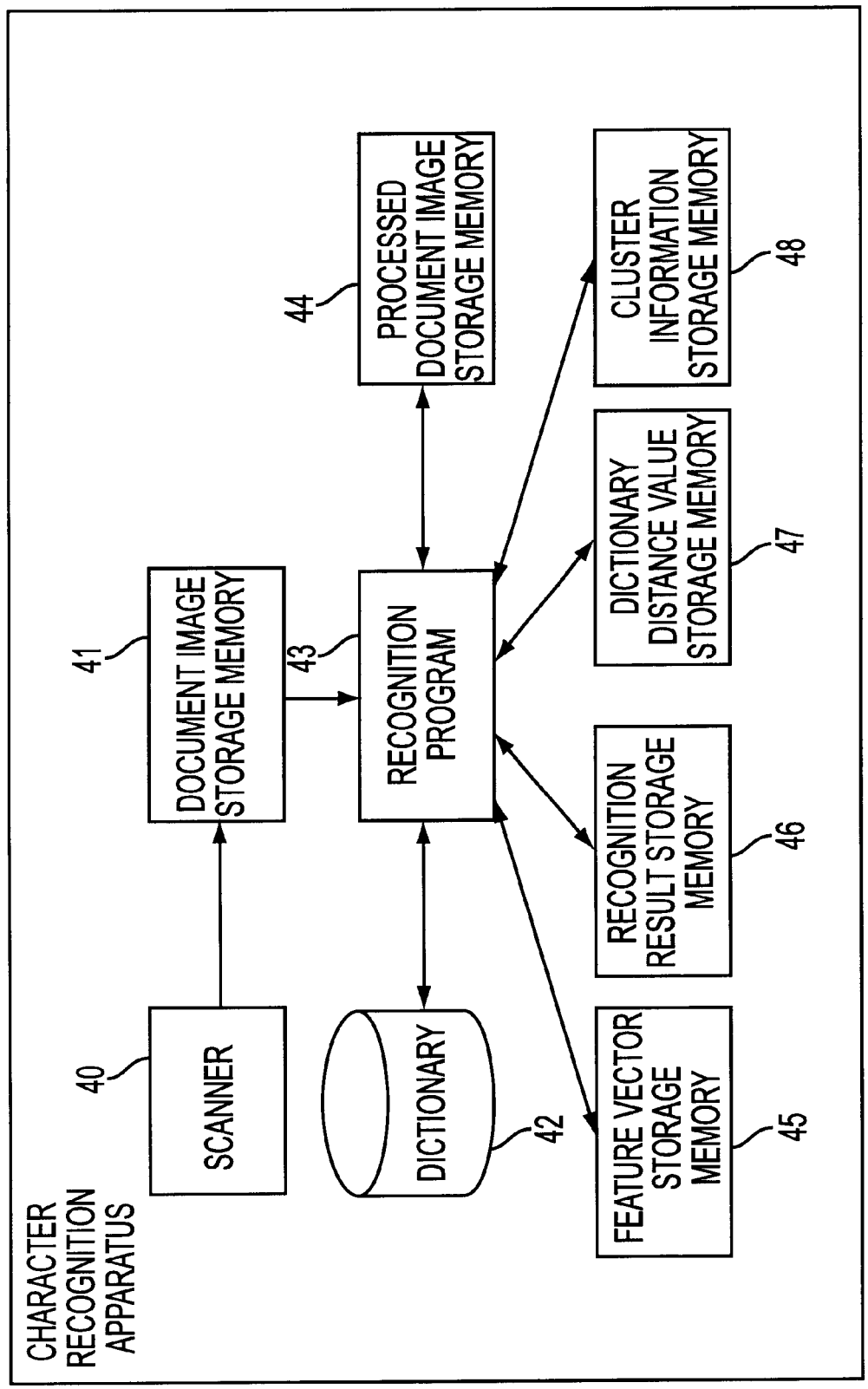
FIG. 17 is a block diagram showing the configuration of the system of the character recognition apparatus according to the first embodiment of the present invention.

As shown in FIG. 17, the character recognition apparatus according to the fourth embodiment of the present invention comprises a scanner 40 for reading the image of a document to be recognized; a document image storage memory 41 storing document image read by the scanner 40; a dictionary 42 for managing the feature vector of each character category, a recognition program 43 for extracting a number of characters written by the same writer from the document image stored in the document image storage memory 41 as characters to be recognized, and recognizing the character categories of the characters to be recognized using the feature vectors of the characters to be recognized through the clustering method; a processed document image storage memory 44 storing the document image of the character to be recognized extracted by the recognition program 43; a feature vector storage memory 45 storing the feature vector of the character to be recognized and computed by the recognition program 43; a recognition result storage memory 46 storing the recognition result of the recognition program 43; and a dictionary distance value storage memory 47 storing the distance value between the character to be recognized by a recognition program 43 and the recognized character category; and a cluster information storage memory 48 storing the clustering result obtained by the recognition program 43.

Figure 18:
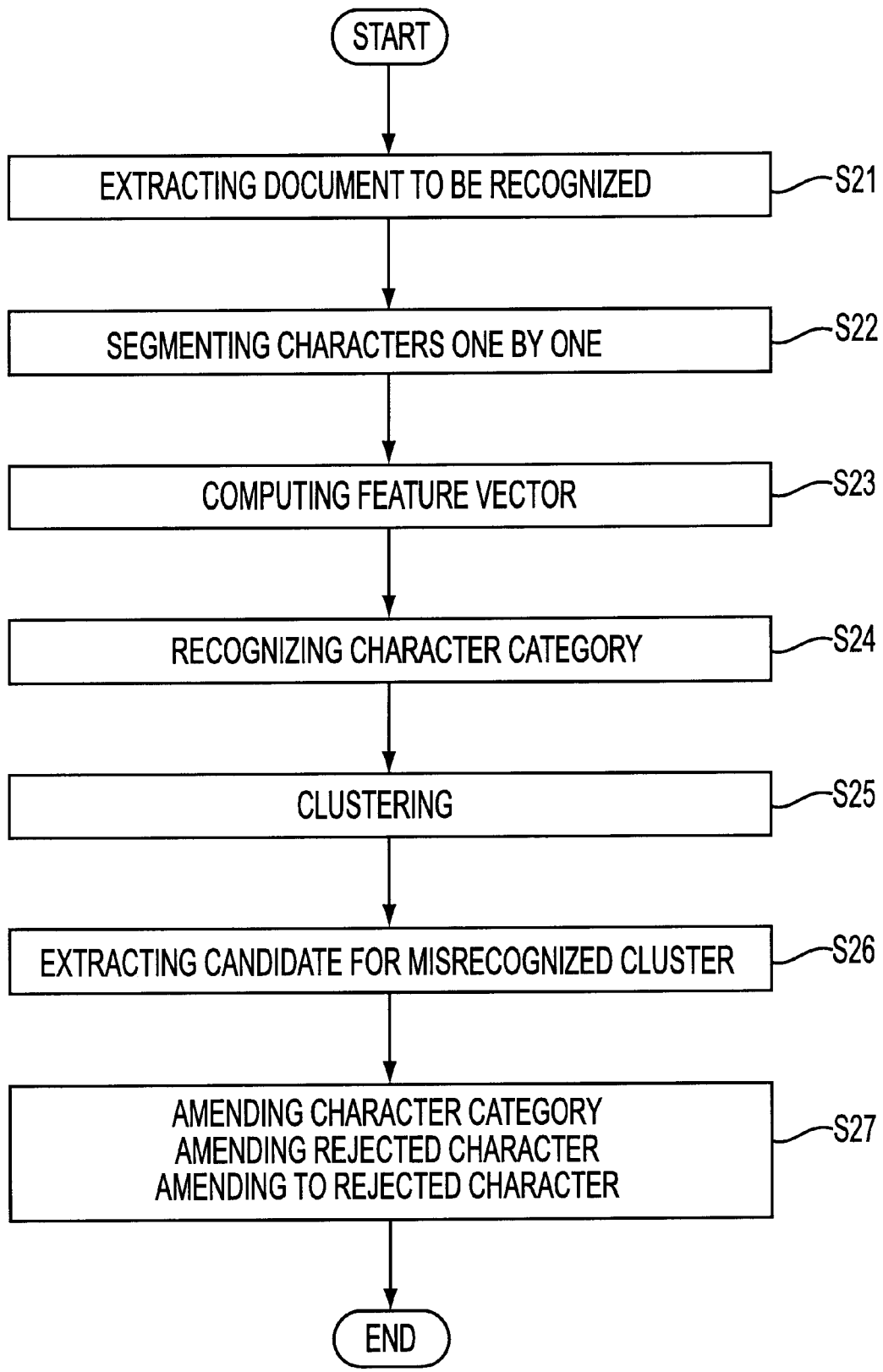
FIG. 18 is a flowchart showing the operation of the character recognition apparatus according to the first embodiment of the present invention.

FIG. 18 shows an embodiment of the process flow executed by the recognition program 43.

The recognition program 43 first extracts the document written by the same writer from the document image stored in the document image storage memory 41 and stores the document in the processed document image storage memory 44 in step 21 as shown by the process flow in FIG. 18 when a request to recognize a document character written by the same writer is issued.

This extracting process is performed, for example, by extracting a marked document when a mark indicating a character written by the same writer is provided in the document image stored in the document image storage memory 41. The process is performed by retrieving a portion defined as written by the same writer in the document as shown in FIG. 7.

Then, in step 22, the document written by the same writer and stored in step 21 is read from the processed document image storage memory 44, and the characters in the document are sequentially segmented character by character. The character segmentation process is performed in the conventional method.

Then, in step 23, the feature vector of each character segmented in step 22 is sequentially computed, and the result is sequentially stored in the feature vector storage memory 45. The feature vector can be any of those used in the conventional method. If the number of dimensions of the feature vector is large, the number of dimensions can be reduced as necessary by the statistic method such as the main component analysis method, the discrimination analysis method, etc.

For example, the characters are segmented in block units with a black block assigned the value 1 and a white block assigned the value 0. When the block values are sequentially arranged from left top to the right bottom to be processed as feature vectors, the feature vectors as shown in FIG. 9 are computed. FIG. 9 shows an example of the feature vectors of the character '2'. Since the handwritten character '2' expressed by vector A, the handwritten character '2' expressed by vector B, and the handwritten character '2' expressed by vector C are a little different in pattern from each other because of handwritten characters, the feature vectors are also different.

In step 24, the character category of each character segmented in step 22 is recognized and stored in the recognition result storage memory 46, and the value of the distance from the recognized character category is stored in the dictionary distance value storage memory 47.

This recognizing process is performed by sequentially reading the feature vector of each character stored in step 23 from the feature vector storage memory 45, computing the distance value between the read feature vector and the feature vector of each character category entered in the dictionary 42 in the conventional method, specifying the smallest distance value, storing the smallest distance value in the dictionary distance value storage memory 47, and storing the character category indicated by the smallest distance value as the recognition result in the recognition result storage memory 46. When the value of the distance from the recognized character category is not equal to or not smaller than a predetermined value, that is, when the recognition reliability is low, the character is set as an unrecognizable and rejected character.

Then, in step 25, a defined cluster is generated by performing a clustering process on the feature vector stored in the feature vector storage memory 45 for each recognized character category to cluster close feature vectors. The cluster information is stored in the cluster information storage memory 48.

There are two methods of performing a clustering process, that is, the hierarchical clustering method and the non-hierarchical clustering method such as the k-means method, the hierarchical mode method, etc.

In the hierarchical clustering method, each feature vector is assumed to be one cluster and the closest clusters in distance are integrated as shown in FIG. 11. This process is repeated to generate a cluster. Once the element in a cluster belongs to the cluster, it is not moved to any other cluster. In FIG. 11, only one character '2' is misrecognized for '4'.

Figure 19:
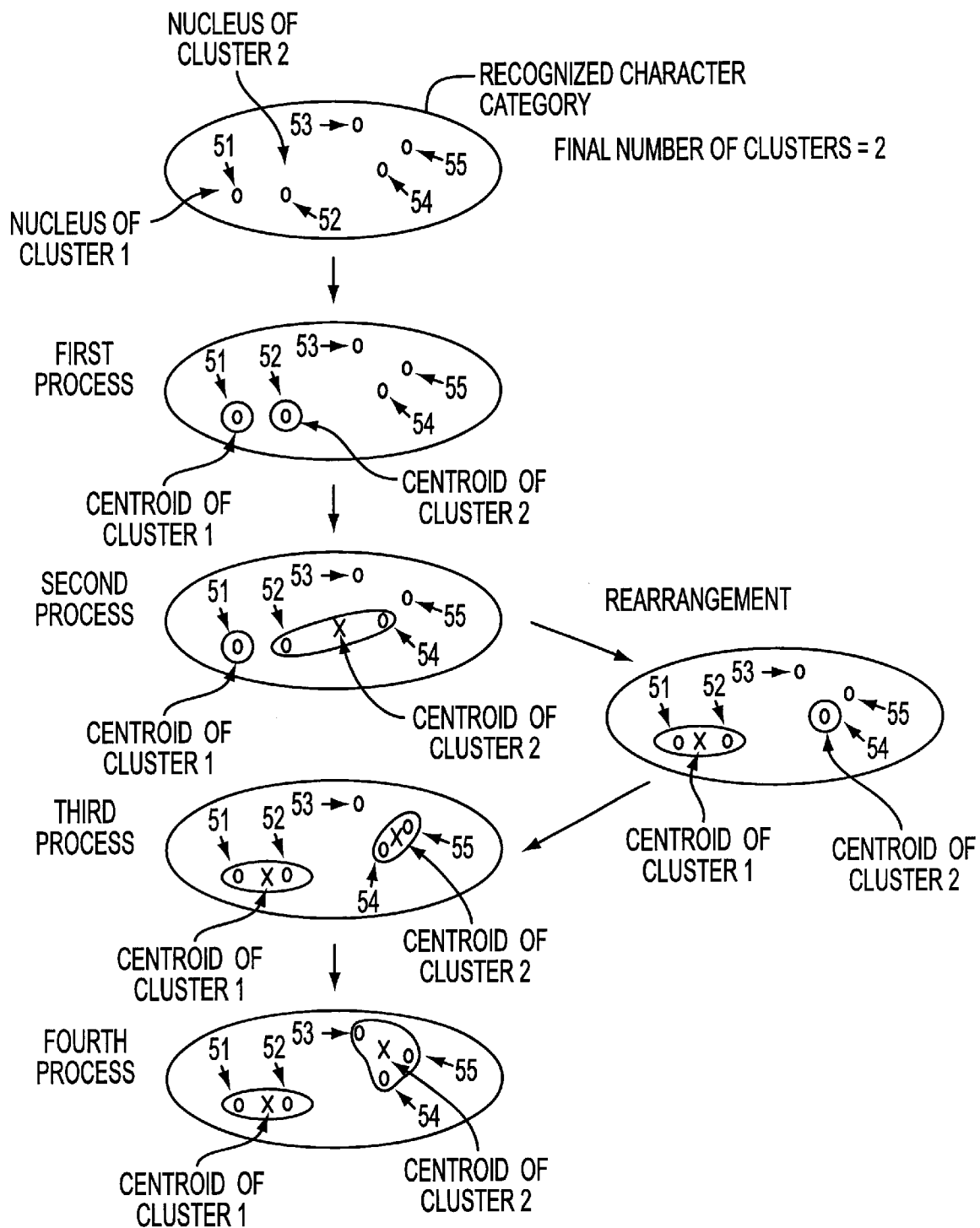
FIG. 19 shows the hierarchical clustering process according to an embodiment of the present invention.

On the other hand, the nonhierarchical clustering process can be explained by the k-means method. That is, as shown in FIG. 19, the final number of clusters is first determined, then the element functioning as nucleus of a cluster is determined and set as the centroid of the cluster. The distance between a specific element and the centroid of each cluster is computed and the element is made to belong to the closest cluster. If a cluster contains an increased number of elements, the position of the centroid of the cluster is recomputed. If the centroid of the closest cluster is changed for the element in each cluster, then a rearranging process is repeated until the position of the centroid of each cluster does not show any change in position of the centroid of each cluster.

For example, if five elements 51 through 55 exist in a recognized character category and the final number of clusters is 2 as shown in FIG. 19, the nuclei of two clusters are set in the recognized character category. In this example, the nucleus of cluster 'is element 51, and the nucleus of cluster 2 is element 52.

In the first process, the number of elements in clusters 1 and 2 is 1, and the centroids of clusters 1 and 2 are elements 51 and 52 respectively.

In the second process, element 54 is selected as the closest element in elements 53 through 55 which do not belong to clusters 1 and 2, and the selected element 54 is integrated into cluster 2.

When element 54 is integrated into cluster 2, the number of elements in cluster 2 is 2 and the centroid of cluster 2 is changed into the point between elements 52 and 54.

Next, the distances between the centroid of cluster 2 and each of elements 51 through 55 are computed. At this time, since element 52 of cluster 2 is closer to the centroid of cluster 1 than to the centroid of cluster 2, element 52 of cluster 2 is rearranged to cluster 1 from cluster 2. Thus, the centroid of cluster 1 is changed into the point between element 51 and element 52, and the centroid of cluster 2 is changed into element 54.

Then, in the third process, element 55 is selected as the closest element in elements 53 through 55 which do not belong to clusters 1 and 2, and the selected element 55 is integrated into cluster 2. The centroid of cluster 2 is changed into the point between element 54 and element 55.

Next, in the fourth process, an element not belonging to clusters 1 and 2 is integrated into the closest cluster 2, and the centroid of cluster 2 is changed into the point between element 53 and element 55.

Unlike the hierarchical clustering method, this nonhierarchical clustering method has the feature that, even after the element has belonged to a cluster, the element in the cluster can be rearranged in another cluster depending on the distribution of the clusters being generated. Thus, a higher-precision clustering process can be performed than in the hierarchical clustering method. However, the process result depends on the nucleus of the first selected cluster.

When the distance between clusters is obtained in the hierarchical clustering method/nonhierarchical clustering method, it can be obtained by computing the distance between feature vectors when the number of elements (feature vector) in the cluster is 1, but can be obtained by, for example, computing the distance between representative vectors obtained by computing the average vector of the feature vectors belonging to the cluster when the number of elements of the cluster is more than one.

When the recognition program 43 enters step 25 in the process flow shown in FIG. 18 using the features of the hierarchical clustering method and the nonhierarchical clustering method, it first generates a cluster by performing a clustering process on feature vectors in the hierarchical clustering method. Then the recognition program 43 performs a high-precision clustering process by performing a clustering process by the nonhierarchical clustering method using the average vector of each cluster as a nucleus.

Figure 20:
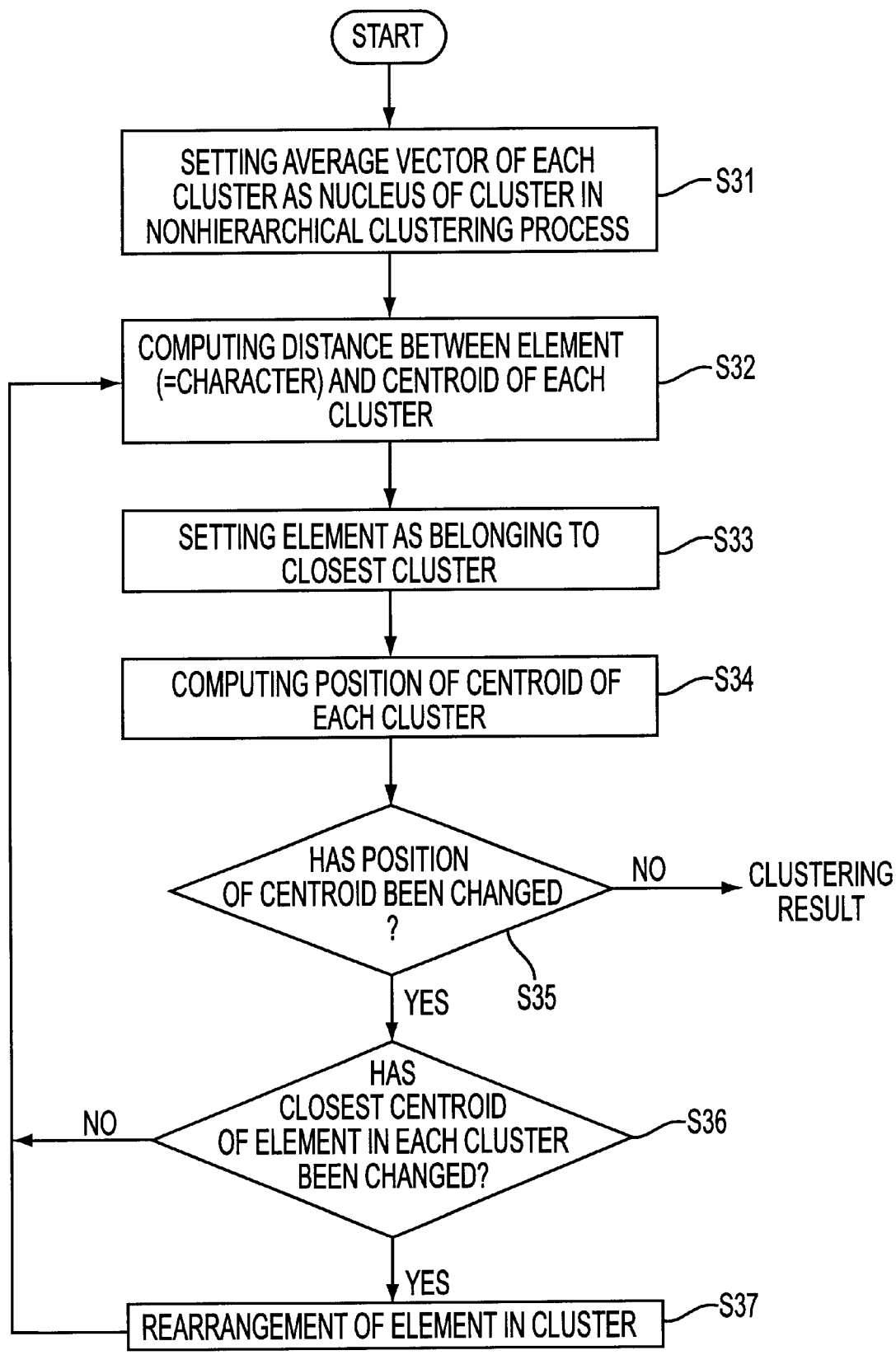
FIG. 20 is a flowchart showing the non-hierarchical clustering process according to an embodiment of the present invention.

FIG. 20 is a flowchart showing the nonhierarchical clustering process.

In FIG. 20, an average vector of each cluster of the recognized character category selected as a process object is first obtained in step 31, and is set as the nucleus of the cluster in the nonhierarchical clustering process.

Then, in step 32, the distance between an element (feature vector of a character) and the centroid of each cluster is computed. In step 33, the element is made to belong to the closest cluster. In step 34, the position of the centroid of each cluster is computed.

Then, in step 35, it is checked whether or not the position of the centroid has been changed. If it is determined that the position of the centroid has not been changed, then the clustering process terminates. If it is determined that the position of the centroid has been changed, then control is passed to step 36, and it is checked whether or not the centroid closest to the element in each cluster has been changed. If it is determined that the centroid has been changed, then control is passed to step 37, the element in the cluster is rearranged, and control is returned to step 32. If it is determined that the centroid has not been changed, then control is returned to step 32. Thus, the nonhierarchical clustering process is performed.

Figure 21:
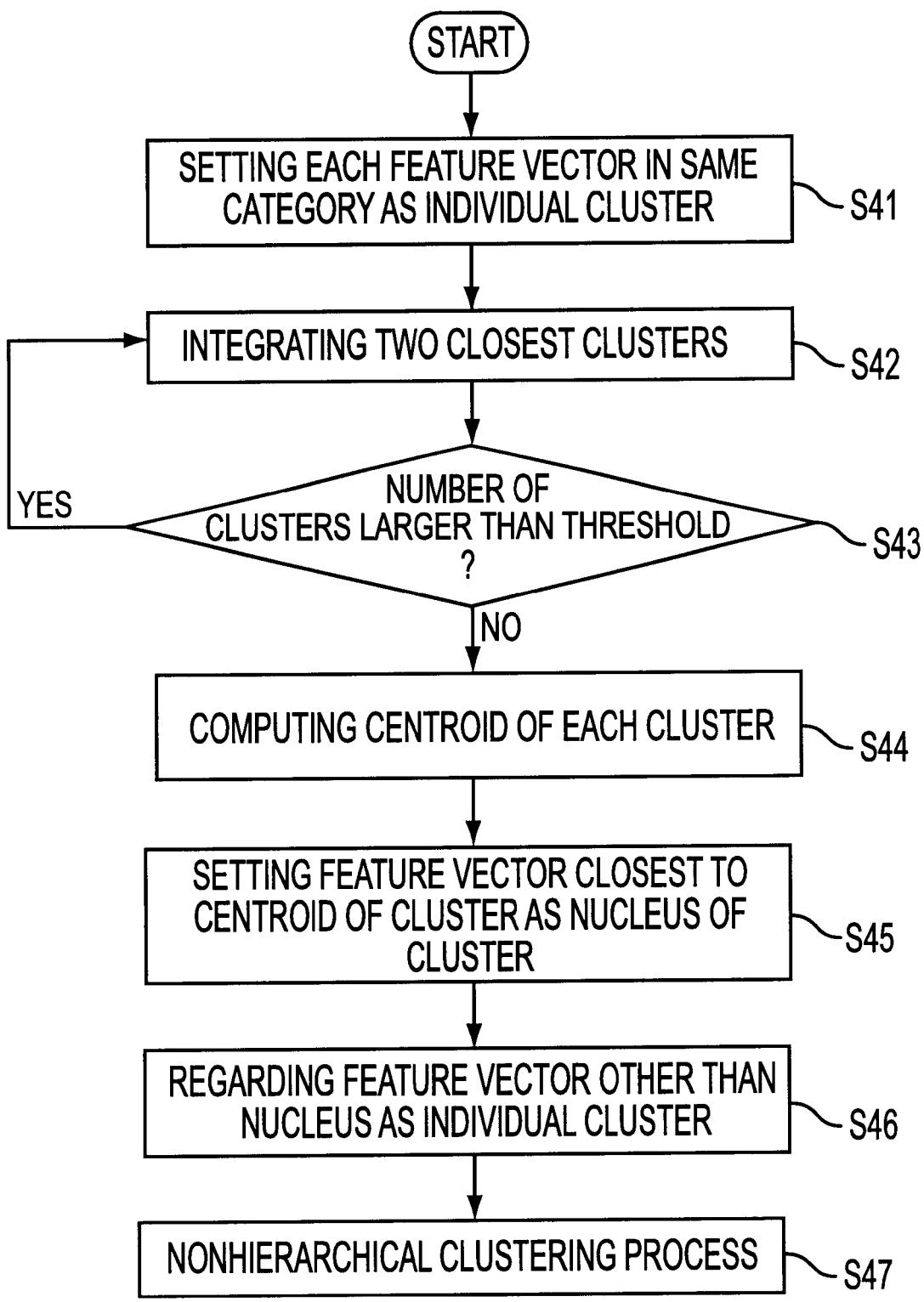
FIG. 21 is a flowchart showing the clustering process according to an embodiment of the present invention.

FIG. 21 is a flowchart showing an embodiment of the nonhierarchical clustering process after performing the hierarchical clustering process.

In FIG. 21, each feature vector in the same category is assumed to be a single cluster (step S41). Two closest clusters are sequentially integrated until the number of clusters is smaller than a predetermined threshold (steps S42 and S43).

Then, the centroid of each cluster is computed (step S44), and the feature vector closest to the centroid of the cluster is set as the nucleus of the cluster (step S45). The feature vector other than the nucleus is assumed to be a single cluster (step S46). The nonhierarchical clustering process is performed (step S47).

Thus, when the recognition program 43 enters step 25 in the process flow as shown in FIG. 18, it first generates a cluster by performing a clustering process on the feature vector by the hierarchical clustering method for each recognized character category. Then, a cluster of the final feature vector is generated by performing the clustering process by the nonhierarchical clustering method using the average vector of each cluster as a nucleus. The cluster information is stored in the cluster information storage memory 48.

As described below, a cluster is generated to extract a character which can be misrecognized with a high possibility. The recognition program 43 performs the above described 2-step clustering process so that correctly recognized characters and misrecognized characters can be generated as separate clusters by performing a re-clustering process in the nonhierarchical clustering method based on the result of the hierarchical clustering process.

When the recognition program 43 generates a cluster of feature vectors for each recognized character category in step 25 in the process flow shown in FIG. 18, then it extracts a candidate for a misrecognized cluster contained in the generated clusters in step 26.

Figure 22:
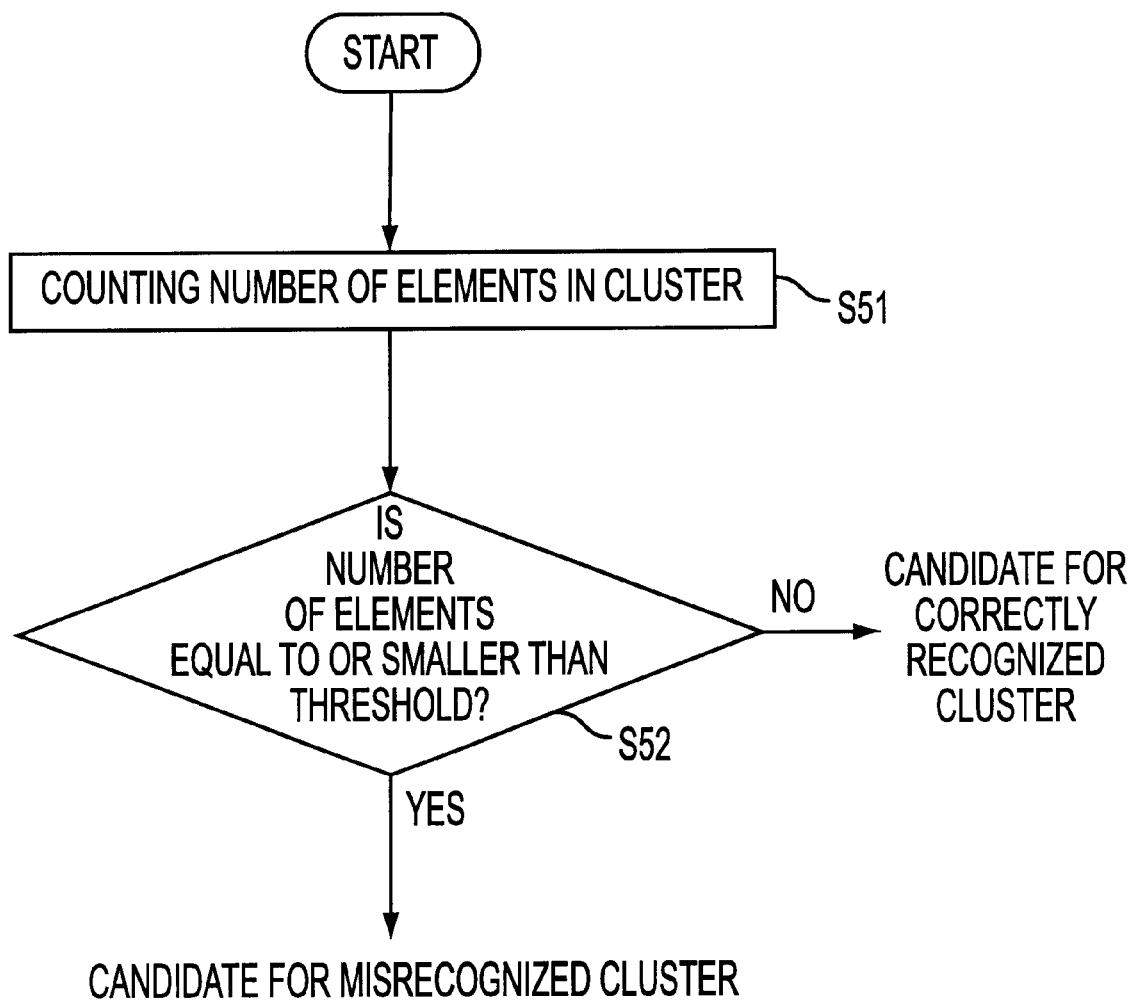
FIG. 22 is a flowchart showing the misrecognized cluster candidate extracting process.

The process of extracting a candidate for a misrecognized cluster is performed as, for example, indicated by the process flow shown in FIG. 22, by counting the number of elements in a cluster (step S51), extracting a cluster containing the number of elements smaller than a predetermined threshold as a candidate for a misrecognized cluster, and extracting the other clusters as candidates for correctly recognized clusters (step S52). That is, in this determination method, it is determined that the cluster containing the number of elements smaller than the threshold can be misrecognized with a high possibility. Since this determination method is performed only based on the number of elements in a cluster, a high-speed process can be easily realized.

Figure 23:
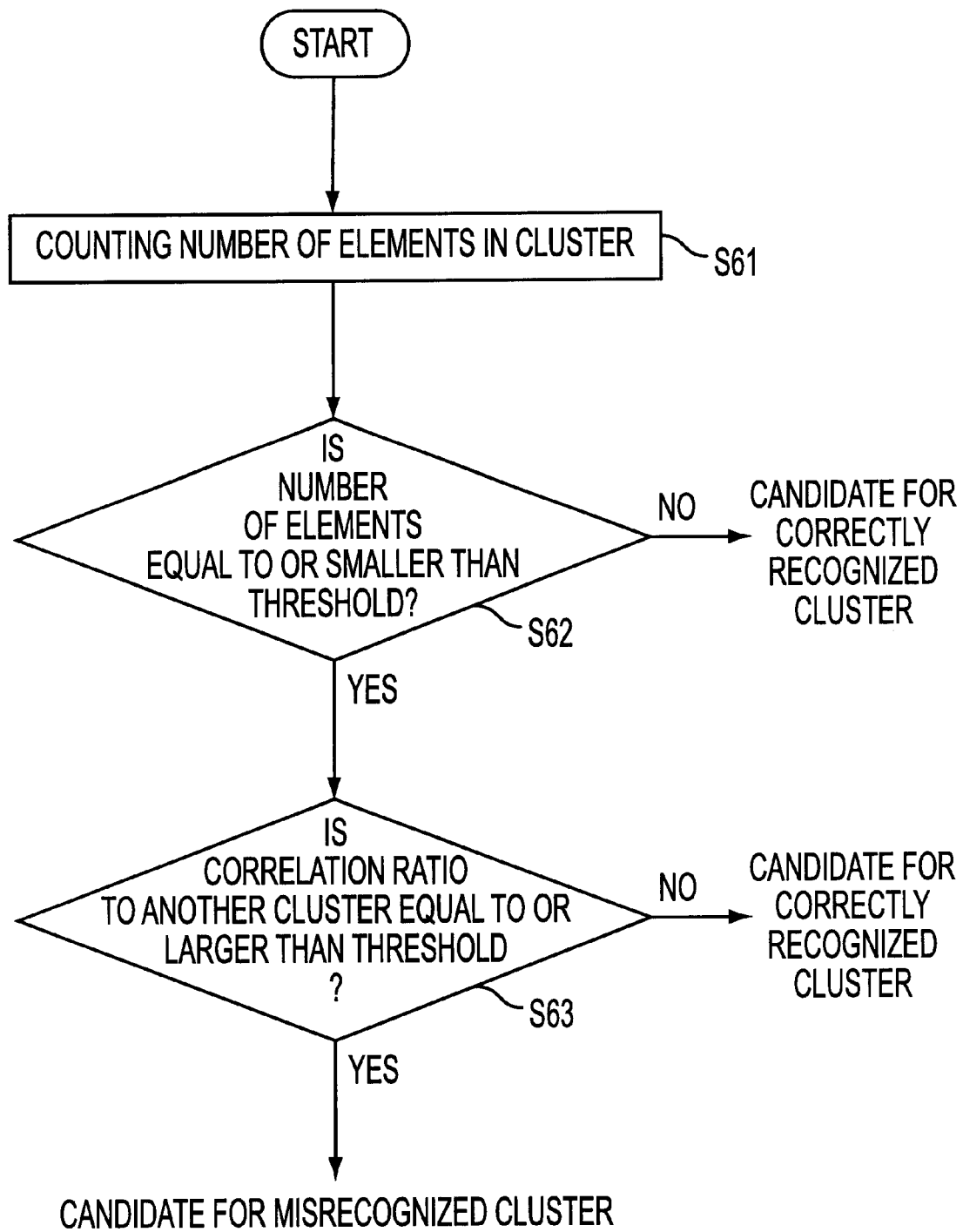
FIG. 23 is a flowchart showing the misrecognized cluster candidate extracting process.

As indicated by the process flow shown in FIG. 23, the process of extracting a candidate for a misrecognized cluster is performed by counting the number of elements in a cluster (step S61), extracting a cluster containing the number of elements smaller than a predetermined threshold (step S62) and indicating a correlation ratio of its recognized character category to the recognized character categories of other clusters larger than the threshold as a candidate for a misrecognized cluster, and extracting the other clusters as candidates for correctly recognized clusters (step S63). The correlation ratio is defined as a value obtained by dividing a between-cluster distribution sum by a total distribution (within-cluster distribution sum+between-cluster distribution sum). The longer the distance from other clusters is, the higher the correlation ratio becomes. That is, in this determination method, it is determined that a cluster containing a small number of elements and being distant from other clusters can be misrecognized with a high possibility. This determination method has a merit that a process can be more correctly performed than in the case where the process is performed only based on the number of elements in a cluster.

Figure 24:
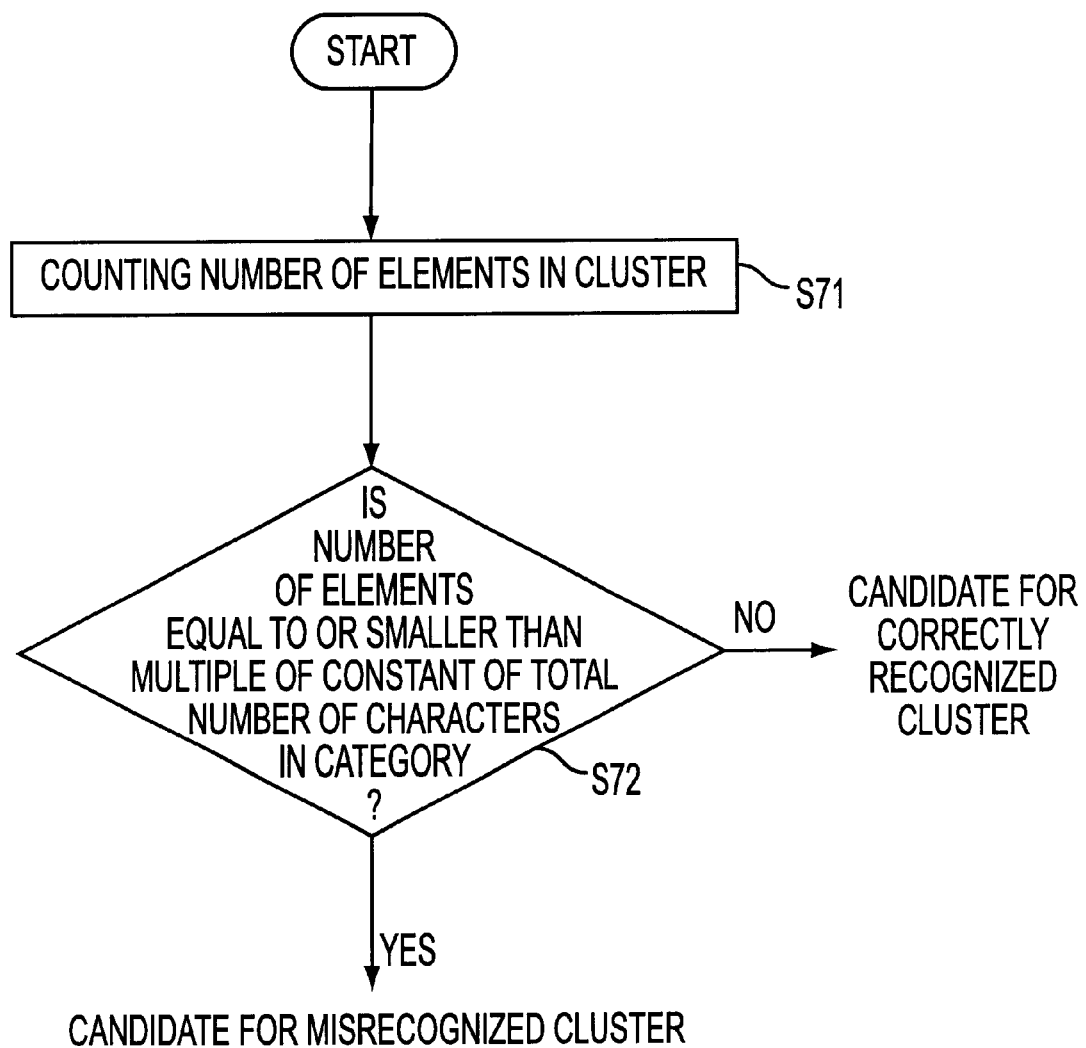
FIG. 24 is a flowchart showing the misrecognized cluster candidate extracting process.

The process of extracting a candidate for a misrecognized cluster is performed as, for example, indicated by the process flow shown in FIG. 24, by counting the number of elements in a cluster (step S71), extracting a cluster containing the number of elements smaller than a multiple of a predetermined constant of the total number of elements of the recognized character category as a candidate for a misrecognized cluster, and extracting the other clusters as candidates for correctly recognized clusters (step S72). That is, in this determination method, it is determined, by setting the number of elements obtained by multiplying the total number of elements by, for example, 0.2 as a threshold, that the cluster containing the number of elements smaller than the threshold can be misrecognized with a high possibility. Since this determination method is performed only based on the number of elements in a cluster, a high-speed process can be easily realized. Additionally, since the threshold is set depending on the total number of elements of the recognized character category, a process can be more correctly performed than in a case where the threshold is a fixed value.

Figure 25:
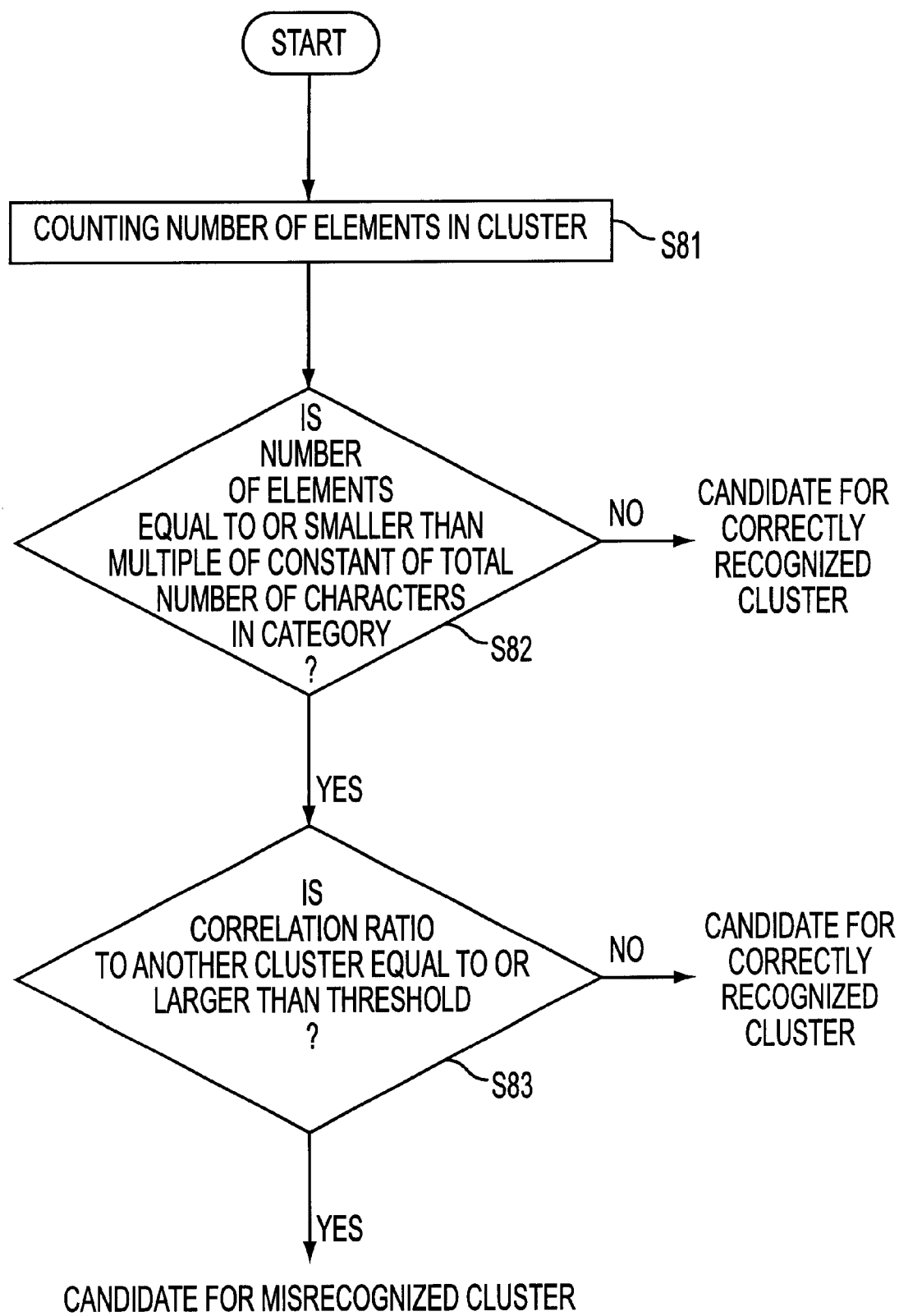
FIG. 25 is a flowchart showing the misrecognized cluster candidate extracting process.

As indicated by the process flow shown in FIG. 25, the process of extracting a candidate for a misrecognized cluster is performed by counting the number of elements in a cluster (step S81), extracting a cluster containing the number of elements smaller than a multiple of a predetermined constant of the total number of elements of the recognized character category (step S82) and indicating a correlation ratio of its recognized character category to the recognized character categories of other clusters larger than the threshold as a candidate for a misrecognized cluster, and extracting the other clusters as candidates for correctly recognized clusters (step S83). That is, in this determination method, it is determined that a cluster containing a smaller number of elements than a threshold defined by a multiple of a predetermined constant of the total number of elements and being distant from other clusters can be misrecognized with a high possibility. This determination method has a merit that a process can be more correctly performed than in the case where the process is performed only based on the number of elements in a cluster. Furthermore, since the threshold is set depending on the total number of elements of the recognized character category, a process can be more correctly performed than in a case where the threshold is a fixed value.

When the recognition program 43 extracts a candidate for a misrecognized cluster in step 26 in the process flow shown in FIG. 18, it amends a misrecognized character category to a correctly recognized character, amends a misrecognized character category to a rejected character, or changes a character defined as a rejected character into a recognizable character in step 27, thereby correctly setting the character category.

Figure 26A:
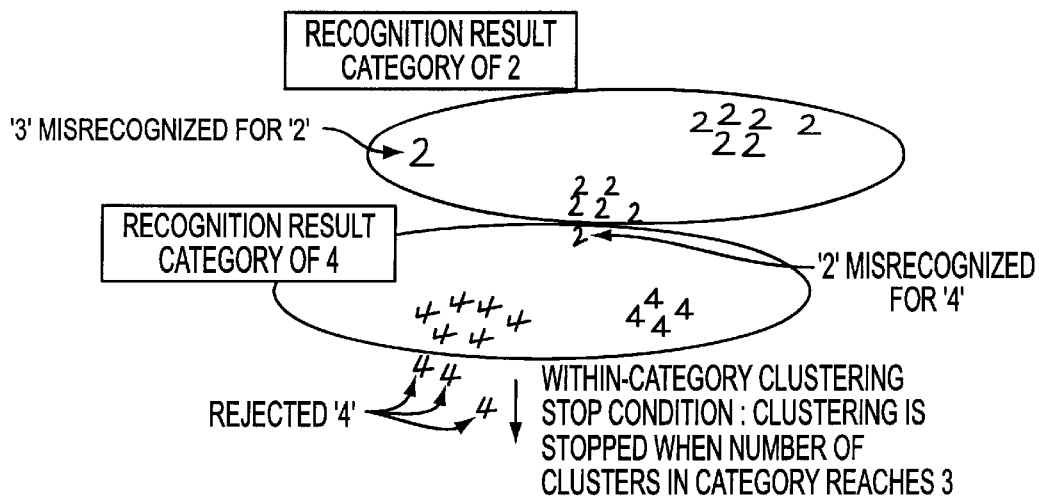
FIG. 26 shows the recognition result amending process.
Figure 26B:
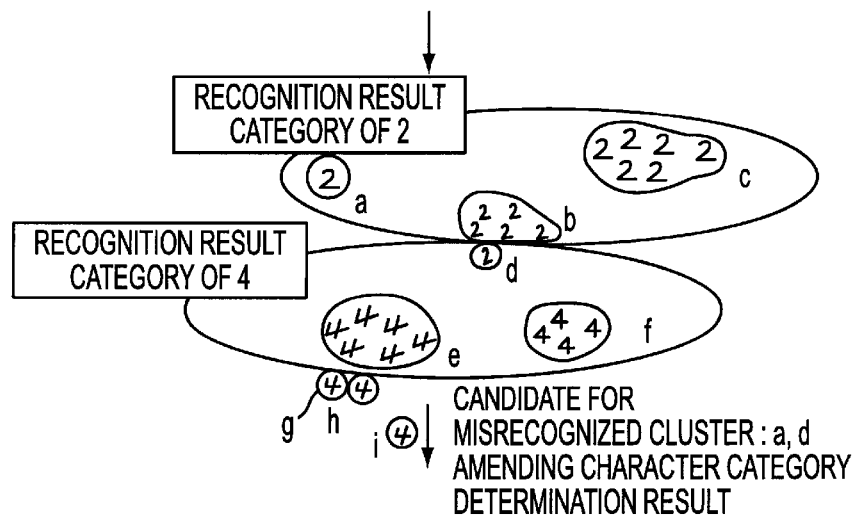
Figure 26C:
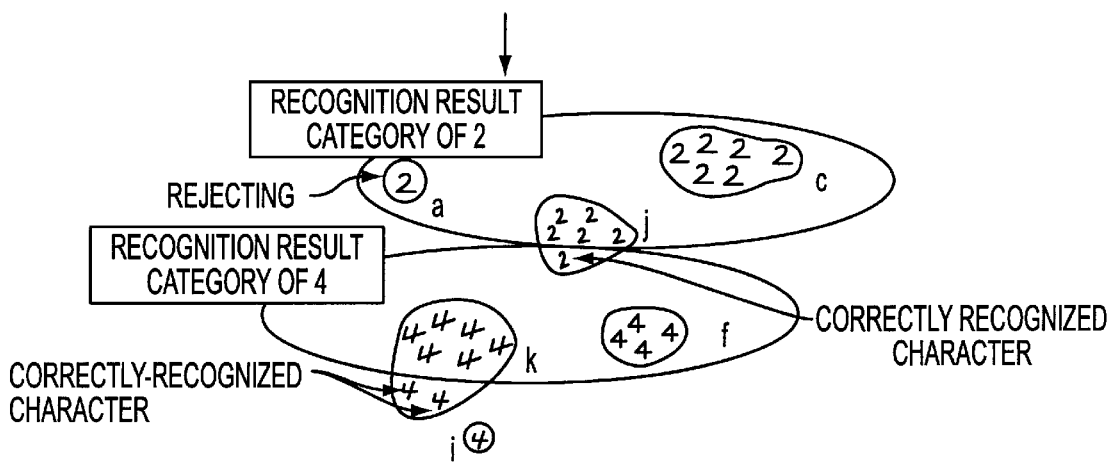

The basic concept of the amending process performed in step 27 is described by referring to FIG. 26. In the processes in steps 23 and 24 of the process flow shown in FIG. 18, the feature vector of a character belonging to each recognized character category can be obtained as indicated by α shown in FIG. 26. In the process in step 25 of the process flow shown in FIG. 18, a cluster of the feature vector belonging to each recognized character category can be generated as indicated by β shown in FIG. 26. In the process in step 26 of the process flow shown in FIG. 18, cluster a belonging to the recognized character category '2' and cluster d belonging to the recognized character category '4' are extracted as candidates for misrecognized clusters from the generated cluster.

In step 27, a cluster whose character category is closest to the candidate for a misrecognized cluster is specified. When the candidate for a misrecognized cluster is close in distance to the cluster, the recognized character category of a character which is contained in the candidates for misrecognized clusters and is distant (the dictionary distance value is stored in the dictionary distance value storage memory 47) from the recognized character category, that is, a character having a low recognition reliability for a recognized character category, is amended from the current category to the character category of the closest cluster.

For example, if cluster b belonging to the recognized character category '2' is specified as a cluster belonging to another character category and closest to a candidate for a misrecognized cluster d as indicated by β and γ shown in FIG. 26, and if the candidate for a misrecognized cluster d is close to cluster b, then the recognized character category of the character which is contained in the candidate for a misrecognized cluster d and has a low recognition reliability on the recognized character category '4' is amended from the current value '4' to '2' of cluster b.

When the recognized character category is changed in the amending process, the recognized character category can be protected from being mischanged because the recognized character category of only a character having a low recognition reliability is changed.

When the cluster belonging to a character category different from the character category of the candidate for a misrecognized cluster is specified, the cluster can be specified at a high speed with precision if a retrieval object is limited to another character category which can be misrecognized, not to all other character categories. When a recognition result indicates a character category referring to the smallest distance value, the cluster can also be specified at a high speed with precision if a retrieval object is limited to a high-order character category indicating the next smallest distance value. That is, since a misrecognized character can be predicted from the character pattern, the process can be performed at a high speed by limiting a retrieval object to a character category which can be misrecognized with a high possibility or to a high-order character category (limiting by the number of categories or by a distance value) which is a candidate to be recognized.

In step 27, if a cluster belonging to a character category closest to that of a rejected character is specified and if the rejected character is close to the cluster, then the rejected character indicating a small value of distance from the recognized character category (as described above, a recognized character category is specified even for a rejected character), that is, the rejected character having a low reliability is removed from rejected characters and is amended to a recognizable character, and the recognized character category is amended from the current category to the character category of the closest cluster.

For example, if cluster e belonging to the recognized character category 4 is specified as a cluster of another character category closest to rejected characters g and h as indicated by β and γ shown in FIG. 26, if rejected characters g and h are close to cluster e, and if the rejection reliability of rejected characters g and h is low, then rejected characters g and h are changed into recognizable characters and the recognized character category is amended from the current category to '4' to which cluster e belongs.

When the rejected character is amended to a correctly recognized character in the amending process, only a rejected character indicating a low rejection reliability is corrected, thereby protecting a rejected character from being mistakenly corrected.

The cluster can be specified at a high speed with precision if a retrieval object is limited to another character category which can be correctly recognized, not to all other character categories when a cluster closest to the rejected character and belonging to another character category is specified. The cluster can also be specified at a high speed with precision if a retrieval object is limited to a high-order character category indicating a small value of distance from the rejected character.

When a candidate for a misrecognized cluster is distant from all clusters of all other character categories in step 27, the character belonging to the candidate for a misrecognized cluster is amended from a recognizable character to a rejected character.

For example, if a candidate for a misrecognized cluster a is distant from all clusters of all other character categories as indicated by $\beta$ and $\gamma$, all characters belonging to the candidate for a misrecognized cluster a are amended from recognizable characters to rejected characters.

In this amending process, a misrecognized character is rejected and the misrecognized ratio can be reduced.

Figure 27:
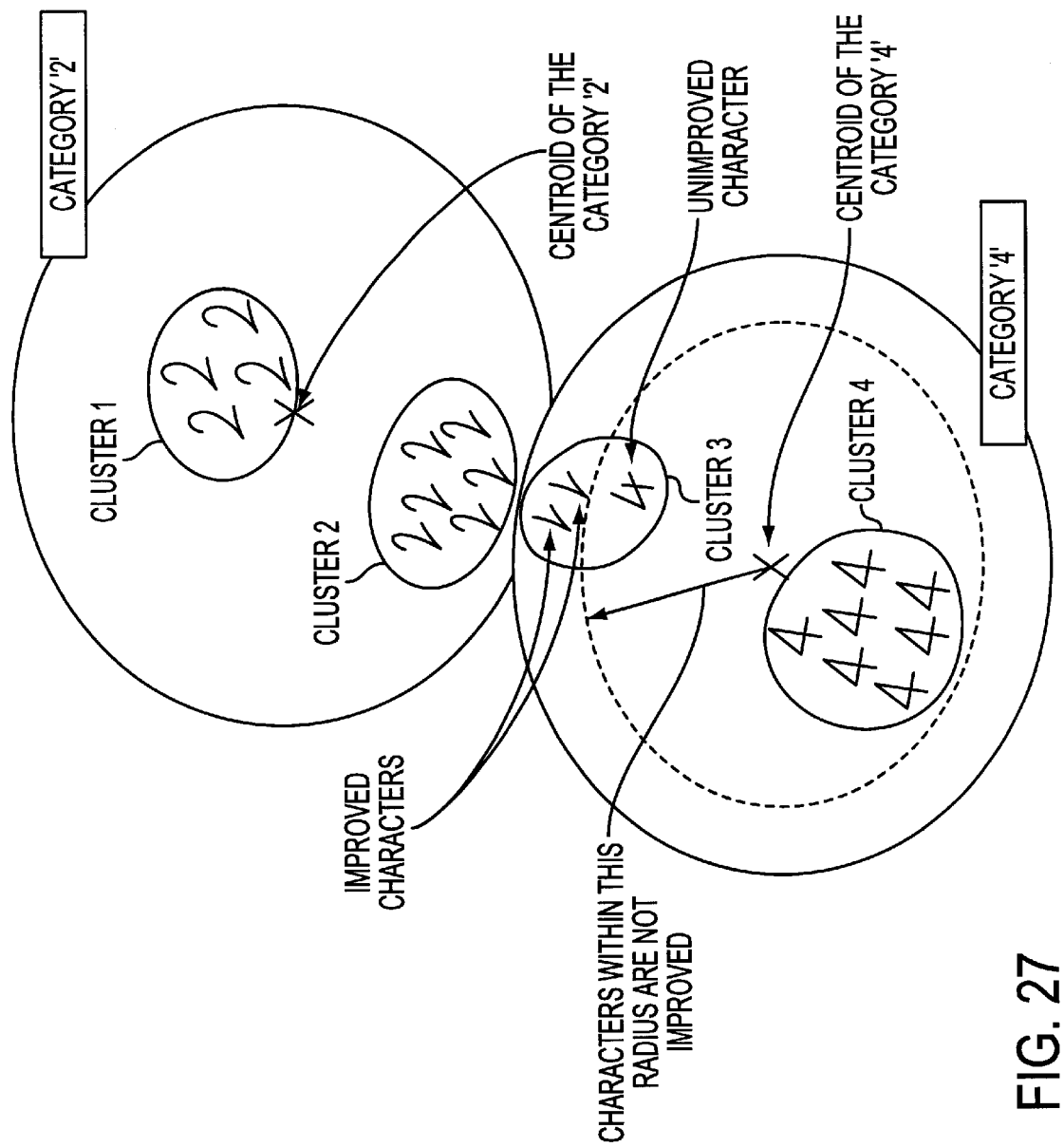
FIG. 27 shows the recognition result amending process.

FIG. 27 practically shows the amending process according to the fourth embodiment of the present invention.

In FIG. 27, two clusters 1 and 2 are generated in category '2', and two clusters 3 and 4 are generated in category '4'. Since cluster 2 is close to cluster 3, cluster 3 containing a smaller number of elements is integrated into cluster 2 containing a larger number of elements. At this time, the distance between the elements of cluster 3 and the centroid of category '4' is checked, and only the elements of cluster 3 distant from the centroid of the category '4' are amended to category 121. The elements of cluster 3 close to the centroid of category are not amended.

Figure 28:
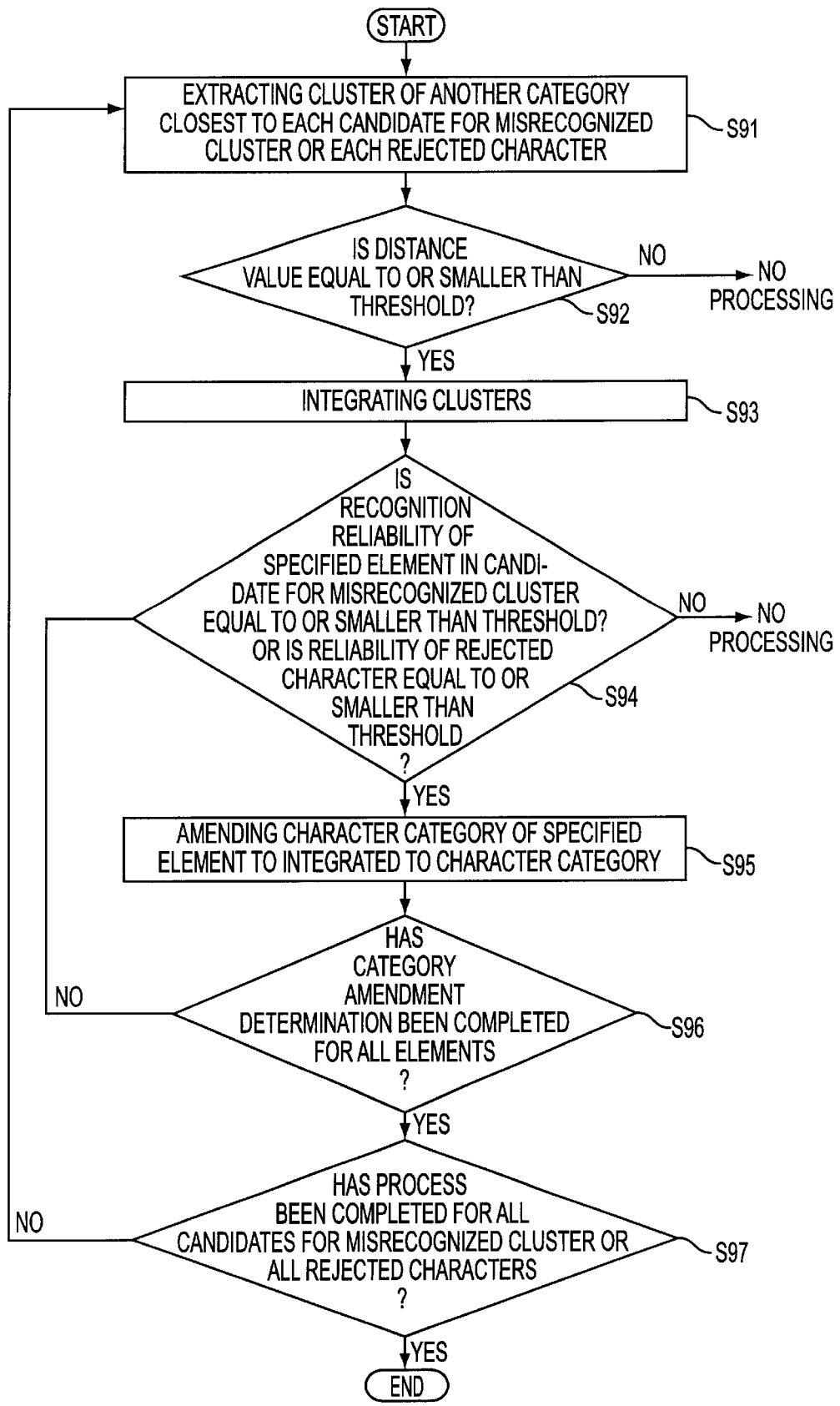
FIG. 28 shows an embodiment of a flowchart showing the recognition result amending process.

FIG. 28 shows an embodiment of the detailed process flow of the recognition result amending process performed in step 27 of the process flow shown in FIG. 18 by the recognition program 43 to perform the recognition result amending process described by referring to FIG. 26.

When the recognition program 43 extracts a candidate for a misrecognized cluster in step 26 of the process flow shown in FIG. 18, it enters step 27 of the process flow shown in FIG. 18 and first extracts the cluster belonging to another character category and closest to each candidate for a misrecognized cluster/each rejected character using a feature vector in step 91 as shown in the process flow shown in FIG. 28.

Then, in step 92, it is determined whether or not the value of distance from the extracted cluster is smaller than a predetermined threshold. If it is determined that the value is not equal to or not smaller than the predetermined threshold, that is, if the extracted cluster is not similar, no processes are performed. However, if the current cluster refers to a candidate for a misrecognized cluster and if the candidate for a misrecognized cluster is distant from all clusters of all other character categories, then the character belonging to the candidate for a misrecognized cluster is amended from a recognizable character to a rejected character.

If it is determined in step 92 that the value of distance from the closest cluster belonging to another character category is smaller than a predetermined threshold, then control is passed to step 93 and the candidate for a misrecognized cluster/rejected cluster is integrated into the extracted cluster. If the current cluster refers to the candidate for a misrecognized cluster in step 94, the characters contained in the candidate for a misrecognized cluster are divided into those having a high recognition reliability and those having a low recognition reliability on the recognized character category. The characters having a high recognition reliability are not processed while the recognized character categories of the characters having low recognition reliability are integrated into the integrated-to categories in step 95.

If the current cluster refers to a rejected character, the rejected characters are divided into the characters indicating high rejection reliability and the characters indicating low rejection reliability. The characters indicating high rejection reliability are not processed while the characters indicating low rejection reliability are removed from the rejected characters and the recognized character categories are amended to the character categories of the closest clusters in step 95.

Then, if the current cluster refers to a candidate for a misrecognized cluster, it is determined whether or not the process has been performed on all characters contained in the candidate for a misrecognized cluster in step 96, and control is returned to step 94 if all the characters have not been processed.

It is determined in step 97 whether or not the process has been performed on all candidates for a misrecognized cluster/all rejected characters. If all the characters have not been processed, then control is returned to step 91. If all the characters have been processed, then the process terminates.

Thus, the recognition program 43 performs the recognition result amending process described by referring to FIG. 26 by performing the process flow shown in FIG. 28.

Thus, the recognition program 43 first extracts the document written by the same writer in step 21 as shown by the process flow in FIG. 18 when a request to recognize a document character written by the same writer is issued. Then, in step 22, the recognition program 43 detects the characters in the extracted document character by character. In step 23, the feature vector of each character is computed. In step 24, the character category of each character is recognized and the value of distance from the recognized character category is specified. In step 25, a cluster is generated by performing the feature vector clustering process for each recognized character category by the hierarchical clustering method/non-hierarchical clustering method. In step 27, a candidate for a misrecognized cluster is extracted from the cluster. In step 27, the recognized character category of the character contained in the candidate for a misrecognized cluster is amended, the character contained in the candidate for a misrecognized cluster is amended to a rejected character, and the rejected character is amended to a recognizable character and a recognized character category is set. Thus, the character recognizing process can be performed on the document entered by the same writer.

As described above, the character recognition apparatus according to the fourth embodiment of the present invention generates a cluster by clustering the feature vector, extracts a cluster which can be misrecognized with a high possibility, and specifies a cluster close to the extracted cluster and belonging to a character category different from that of the extracted cluster. If these cluster are similar to each other, the recognized character category of an input character contained in the cluster which can be misrecognized with a high possibility and has a low recognition reliability is changed into the recognized character category of the similar cluster. As a result, the character category of a character conventionally misrecognized can be automatically amended, and a handwritten character can be recognized with high precision without preliminarily collecting the character samples.

If the cluster which can be misrecognized with a high possibility is not similar to any other clusters of all other character categories, then an input character belonging to the cluster which can be misrecognized with a high possibility is changed into a rejected character. Therefore, the character to be rejected is not misrecognized, thereby recognizing a handwritten character with high precision.

If a cluster closest to the rejected input character and belonging to another character category is specified, if they are similar to each other, and if the rejection reliability of the rejected input character is low, then the rejected input character is changed into a recognizable character and the recognized character category is amended to the recognized character category of the similar cluster. Therefore, a readable rejected character can be correctly recognized and the character recognizing process can be correctly performed.

Next, the character recognition apparatus according to the fifth embodiment of the present invention is described by referring to the attached drawings.

In FIG. 29, for example, the handwritten character '4' can be easily misrecognized for '6' or '9'. However, it is experimentally predicted that the handwritten character '4' may not be misrecognized for 1' or '3'.

Therefore, the information about a candidate for a misrecognized-for character is preliminarily stored.

Then, for example, the amended-to category of the handwritten character discriminated as '4' is limited to '6' or '9', not to '1' or '3'.

Described below is the character recognition apparatus according to the sixth embodiment of the present invention.

According to the sixth embodiment of the present invention, when the handwritten character '2' is input, the feature vector of the input character is compared in distance with the vector or each category entered in the dictionary in the one-character recognizing process. The categories are output in order from the smallest in distance value. For example, "2-3-9-4- . . . " is output for the handwritten character '2'. This indicates that the first candidate for a recognized category is '2', the second candidate for a recognized category is '3', and the third candidate for a recognized category is '9'.

In the case of a misrecognized character, the first candidate for a recognized category is misrecognized. For example, the recognition result categories are output sequentially from the smallest in distance value "4-2-3-9- . . . " for the handwritten character '2' misrecognized for '4'. When the character category of the handwritten character '2' misrecognized for '4' is amended in the clustering process, it is determined whether or not the amended-to category is a higher-order candidate for a recognized category (for example, the third category). The amending process is performed only when the amended-to category is a higher-order category.

In the above described embodiments, the category of a misrecognized handwritten character is amended. However, the present invention is not limited to the above described embodiments, and can be applied to many other applications.

For example, the recognition result of misrecognized or rejected obscure or deformed character can be amended by clustering an obscure character and a deformed character.

What is claimed is:

1. A character recognition apparatus recognizing a handwritten character in image data in a document, comprising:
   a same writer entry area extracting unit extracting an area to which characters are written by a same writer from the image data in the document;
   a feature vector computing unit computing a feature vector of each character in all characters in the area extracted by said same writer entry area extracting unit;
   a character recognition unit determining a character category of each character based on a distance between the feature vector of each character computed by said feature vector computing unit and a reference vector entered in a dictionary;
   a clustering unit recognizing each feature vector to be a cluster, and performing a clustering process by sequentially integrating clusters whose distance is the closest;
   a clustering unit recognizing each feature vector to be a cluster, and performing a clustering process by sequentially integrating clusters whose distance is the closest;
   a comparing unit comparing a clustering result from the clustering unit with the character recognition result from the character recognition unit and outputting a compared result;
   a character recognition result amending unit amending the character category of a first integrated cluster to the character category of a second integrated cluster using the compared result when the integrated clusters are different from each other and outputting an amended character recognition result indicative thereof; and
   a clustering result storage unit storing the clustering result from the clustering unit, wherein the character recognition result amending unit amends the clustering result stored in the clustering result storage unit to the amended character recognition result.

2. The character recognition apparatus according to claim 1, wherein
   said character recognition result amending unit comprises:
      a cluster integrating unit comparing a distance between clusters in all categories based on a process result from said clustering unit, and integrating the clusters indicating a between cluster distance smaller than a predetermined threshold;
      a within-cluster character category determining unit determining whether or not the character categories of the clusters integrated by said cluster integrating unit are different based on the all character recognition result from said character recognition unit; and
      a character category amending unit amending the character category of a first cluster containing a smaller number of elements to the character category of a second cluster when said within-cluster character category determining unit determines that the integrated clusters are different from each other.

3. The character recognition apparatus according to claim 1, wherein
   said clustering unit comprises:
      a hierarchical clustering unit sequentially integrating characters similar to each other in feature vector as a cluster by performing a hierarchical clustering process on the feature vectors in a character category; and
      a clustering stop unit stopping the hierarchical clustering process when a number of clusters in a category reaches a predetermined value after performing the hierarchical clustering process by said hierarchical clustering unit.

4. The character recognition apparatus according to claim 1, wherein
   said clustering unit comprises:
      a hierarchical clustering unit sequentially integrating characters similar to each other in feature vector as a cluster by performing a hierarchical clustering process on the feature vectors in a character category; and
a clustering stop unit stopping the hierarchical clustering process when a between-cluster distance at a time of cluster integration is equal to or larger than a predetermined threshold in the hierarchical clustering process performed by said hierarchical clustering unit.

5. The character recognition apparatus according to claim 1, wherein
said clustering unit comprises:
a hierarchical clustering unit sequentially integrating characters similar to each other in feature vector as a cluster by performing a hierarchical clustering process on the feature vectors in a character category; and
a clustering stop unit stopping the hierarchical clustering process when an increase ratio of a between-cluster distance at a time of cluster integration is equal to or larger than a predetermined threshold in the hierarchical clustering process performed by said hierarchical clustering unit.

6. A character recognition apparatus for recognizing a character category of a number of input characters input by a same writer, comprising:
a computing unit computing a feature vector of an input character;
a recognition unit computing a distance value between the feature vector computed by said computing unit and a reference vector of each character category entered in a dictionary, recognizing the character category indicating a smallest distance value as the character category of the input character, and rejecting the input character as unrecognizable when a value of distance from the recognized character category is not equal to or not smaller than a predetermined value;
a clustering unit generating one or more clusters for each character category by clustering the feature vectors of all input characters computed by said computing unit each character category recognized by said recognition unit based on a value of distance between feature vectors calculated by said computing unit and sequentially integrating clusters whose distance is the closest;
an amending unit amending the character category of an integrated cluster being different from other integrated clusters in character category based on a process result from said clustering unit, the feature vector computed by said computing unit, the character category recognized by said recognition unit, and the value of distance computed by said recognition unit between the feature vector computed by said computing unit and the reference vector of each character category and outputting an amended result indicative thereof; and
a clustering result storage unit storing the process result from the clustering unit, wherein the amending unit amends the process result stored in the clustering result storage unit to the amended result.

7. The character recognition apparatus according to claim 6, wherein
said amending unit comprises:
an extracting unit extracting a cluster which can be misrecognized with a high possibility from the clusters generated by said clustering unit;
a specifying unit specifying a cluster in another character category which is closest to the extracted cluster, where a total number of characters in the specified cluster is more than a threshold; and
a changing unit changing a recognized character category of an input character, which belongs to the cluster extracted by said extracting unit and comprising a distance value equal to or larger than a predetermined value, into a character category that the specified cluster belongs to if the distance value between the cluster extracted by said extracting unit and the cluster specified by said specifying unit is less than the predetermined value.

8. The character recognition apparatus according to claim 7, wherein
said amending unit further comprises a second changing unit changing the input character belonging to the cluster extracted by said extracting unit into a rejected character when values of distance between the cluster extracted by said extracting unit and all clusters of all other character categories are equal to or larger than the predetermined value.

9. The character recognition apparatus according to claim 6, wherein said amending unit comprises:
a specifying unit specifying a cluster closest to the input character rejected by said recognition unit and belonging to another character category using the feature vector computed by said computing unit; and
a changing unit changing an input character rejected by said recognition unit and indicating a value of distance from the recognized character category equal to or smaller than a predetermined value into a recognizable character and setting the character category of the cluster specified by said specifying unit as the recognized character category of the changed input character when a value of distance between the input character rejected by said recognition unit and the cluster specified by said specifying unit is equal to or smaller than the predetermined value.

10. The character recognition apparatus according to claim 7, wherein
said extracting unit extracts a cluster containing a number of input characters equal to or smaller than a predetermined value as a cluster which can be misrecognized with a high possibility.

11. The character recognition apparatus according to claim 7, wherein
said extracting unit extracts a cluster, as a cluster which can be misrecognized with a high possibility, containing a number of input characters equal to or smaller than a multiple of a predetermined constant of a total number of input characters of the character category to which the cluster belongs.

12. The character recognition apparatus according to claim 7, wherein
said extracting unit extracts, as a cluster which can be misrecognized with a high possibility, a cluster containing a number of input characters equal to or smaller than a predetermined value and indicating a value of distance between a character category of the cluster and other clusters equal to or larger than a predetermined value.

13. The character recognition apparatus according to claim 7, wherein
said extracting unit extracts a cluster, as a cluster which can be misrecognized with a high possibility, containing a number of input characters equal to or smaller than a multiple of a predetermined constant of a total number of input characters of the character category to which the cluster belongs, and equal to or larger than a predetermined value of distance from another cluster of the character category.

14. The character recognition apparatus according to claim 7, wherein
said specifying unit preliminarily determines another character category to be specified depending on the character category of a specification character category.

15. The character recognition apparatus according to claim 7, wherein
said specifying unit limits another character category to be specified to a high-order character category whose distance value is less than or equal to a predetermined threshold computed by said recognition unit.

16. The character recognition apparatus according to claim 6, wherein
said clustering unit first generates a cluster by performing a clustering process in a hierarchical clustering method, and then performs the clustering process in a non-hierarchical clustering method using the cluster as an initial state.

17. A character recognition apparatus comprising:
a recognition unit recognizing a category of a character extracted from an input image;
a clustering unit generating at least one cluster from characters extracted from the input image by comparing the characters extracted from the input image with each other;
a cluster extracting unit extracting a cluster containing a number of elements smaller than a predetermined value from the cluster generated by said clustering unit;
a between-cluster distance computing unit computing a between-cluster distance between a first cluster belonging to a first category extracted by said cluster extracting unit and a second cluster belonging to a second category generated by said clustering unit;
a category amending unit integrating the first cluster into the second cluster when a value of the between-cluster distance between the first cluster and the second cluster is equal to or smaller than a predetermined value, and amending, from the first category to the second category, the category belonging to the first cluster and outputting an amended result indicative thereof; and
a clustering result storage unit storing the cluster generated by the clustering unit, wherein the category amending unit amends the cluster stored in the clustering result storage unit to the amended result.

18. The character recognition apparatus according to claim 17, further comprising:
a rejecting unit rejecting a character belonging to a third cluster by extracting the third cluster whose between-cluster distance is larger or equal to a predetermined threshold from another cluster in a same category; and
a rejection amending unit computing distance values between the character rejected by said rejecting unit and the clusters generated by said clustering unit, integrating the character rejected by said rejecting unit into a fourth cluster, wherein the fourth cluster is approximate to the character rejected by said rejecting unit, and amending the category of the character rejected by said rejecting unit to a third category to which the fourth cluster belongs.

19. The character recognition apparatus according to claim 17, wherein
said character is a character handwritten by a same writer.

20. A character recognition apparatus comprising:
a recognition unit recognizing a category of a character extracted from an input image;
a clustering unit generating at least one cluster from characters extracted from the input image by comparing the characters extracted from the input image with each other;
a cluster extracting unit extracting a cluster containing a number of elements smaller than a predetermined value from the cluster generated by said clustering unit;
a between-cluster distance computing unit computing a between-cluster distance between a first cluster belonging to a first category and containing a number of elements equal to or smaller than a predetermined value and a second cluster belonging to a second category generated by said clustering unit;
a recognition reliability obtaining unit obtaining recognition reliability of a character belonging to the first cluster from said recognition unit when a value of the between-cluster distance between the first cluster and the second cluster is equal to or smaller than a predetermined value;
a category amending unit amending, from the first category to the second category, the category of the character belonging to the first cluster comprising the recognition reliability equal to or smaller than a predetermined value and outputting an amended result indicative thereof; and
a clustering result storage unit storing the cluster generated by the clustering unit, wherein the category amending unit amends the cluster stored in the clustering result storage unit to the amended result.

21. A method of recognizing a character, comprising:
recognizing a category of a character extracted from an input image;
generating at least one cluster from characters extracted from the input image by comparing the characters extracted from the input image with each other;
extracting a cluster containing elements equal to or smaller than a predetermined value from the cluster generated;
computing a between-cluster distance between a first cluster belonging to a first category and containing elements equal to or smaller than a predetermined value and a second cluster belonging to a second category;
integrating the first cluster into the second cluster when a value of the between-cluster distance between the first cluster and the second cluster is equal to or smaller than a predetermined value;
amending from the first category to the second category the category belonging to the first cluster and outputting an amended result indicative thereof;
storing the cluster generated; and
amending the stored cluster generated to the amended result.

22. A method of recognizing a character comprising:
recognizing a category of a character extracted from an input image;
generating at least one cluster from characters extracted from the input image by comparing the characters extracted from the input image with each other;
extracting a cluster containing elements equal to or smaller than a predetermined value from the cluster generated;

computing a between-cluster distance between a first cluster belonging to a first category and containing elements equal to or smaller than a predetermined value and a second cluster belonging to a second category;

obtaining recognition reliability of a character belonging to the first cluster when a value of the between-cluster distance between the first cluster and the second cluster is equal to or smaller than a predetermined value;

amending, from the first category to the second category, the category of the character belonging to the first cluster comprising the recognition reliability equal to or smaller than a predetermined value and outputting an amended result indicative thereof;

storing the cluster generated; and amending the stored cluster generated to the amended result.

23. A computer-readable medium used to direct a computer to perform:

recognizing a category of a character extracted from an input image;

generating at least one cluster from characters extracted from the input image by comparing the characters extracted from the input image with each other;

extracting a cluster containing elements equal to or smaller than a predetermined value from the cluster generated;

computing a between-cluster distance between a first cluster belonging to a first category and containing elements equal to or smaller than a predetermined value and a second cluster belonging to a second category;

integrating the first cluster into the second cluster when a value of the between-cluster distance between the first cluster and the second cluster is equal to or smaller than a predetermined value;

amending from the first category to the second category the category belonging to the first cluster and outputting an amended result indicative thereof;

storing the cluster generated; and amending the stored cluster generated to the amended result.

24. A computer-readable medium used to direct a computer to perform:

recognizing a category of a character extracted from an input image;

generating at least one cluster from characters extracted from the input image by comparing the characters extracted from the input image with each other;

extracting a cluster containing elements equal to or smaller than a predetermined value from the cluster generated;

computing a between-cluster distance between a first cluster belonging to a first category and containing elements equal to or smaller than a predetermined value and a second cluster belonging to a second category;

obtaining recognition reliability of a character belonging to the first cluster when a value of the between-cluster distance between the first cluster and the second cluster is equal to or smaller than a predetermined value;

amending, from the first category to the second category, the category of the character belonging to the first cluster comprising the recognition reliability equal to or smaller than a predetermined value and outputting an amended result indicative thereof;

storing the cluster generated; and amending the stored cluster generated to the amended result.

25. The method of recognizing a character according to claim 21, further comprising:

extracting a third cluster whose between-cluster distance is larger or equal to a predetermined threshold from another cluster in a same category;

rejecting a character belonging to the third cluster;

computing distance values between the character rejected and the clusters generated;

integrating the character rejected into a fourth cluster, wherein the fourth cluster is approximate to the character rejected; and amending a category of the character rejected to a third category to which the fourth cluster belongs.

* * * * *